United States Patent
Alvarado et al.

(10) Patent No.: US 7,634,443 B2
(45) Date of Patent: Dec. 15, 2009

(54) METHOD FOR MANAGING RISK IN MARKETS RELATED TO COMMODITIES DELIVERED OVER A NETWORK

(75) Inventors: Fernando L. Alvarado, Madison, WI (US); Rajesh Rajaraman, Madison, WI (US)

(73) Assignee: Morgan Stanley Dean Witter & Co., New York City, NY (US)

(*) Notice: Subject to any disclaimer, the term of this patent is extended or adjusted under 35 U.S.C. 154(b) by 0 days.

(21) Appl. No.: 11/898,137

(22) Filed: Sep. 10, 2007

(65) Prior Publication Data
US 2008/0005010 A1 Jan. 3, 2008

Related U.S. Application Data

(63) Continuation of application No. 10/118,330, filed on Apr. 9, 2002, which is a continuation-in-part of application No. 09/522,709, filed on Mar. 10, 2000.

(60) Provisional application No. 60/123,823, filed on Mar. 11, 1999, provisional application No. 60/330,594, filed on Oct. 25, 2001.

(51) Int. Cl.
*G06Q 40/00* (2006.01)

(52) U.S. Cl. ............... 705/38; 705/8; 705/10; 705/12; 705/36 R; 705/37; 705/412; 700/99; 709/249

(58) Field of Classification Search ............ 705/8, 705/10, 12, 36 R, 37, 38, 412; 700/99; 709/249
See application file for complete search history.

(56) References Cited

U.S. PATENT DOCUMENTS

5,758,331 A * 5/1998 Johnson ............... 705/412

(Continued)

OTHER PUBLICATIONS

"The Dynamics of Power System Markets" by Fernando L. Alvarado dated Mar. 12, 1997, published as Report No. PSerc-97-01, pp. 1-22.*

(Continued)

*Primary Examiner*—James P Trammell
*Assistant Examiner*—Sanjeev Malhotra
(74) *Attorney, Agent, or Firm*—McDermott Will & Emery LLP

(57) ABSTRACT

A system, method, software, and portfolios for managing risk in markets relating to a commodity delivered over a network are described, in which a market participant constructs portfolios of preferably liquid price risk instruments in proportions that eliminate the Spatial Price Risk for the market participant's underlying position. Techniques are also disclosed for constructing and evaluating new price risk instruments and other sets of positions, as well as identifying arbitrage opportunities in those markets. In particular, a "deltas vector" is calculated concerning a portfolio of future positions and derivative contracts, wherein the "deltas vector" is the partial derivative of the market participant's net market position taken with respect to the forward shadow prices $\lambda$ of the network which depend upon congestion in the network. The "deltas vector" can then be used to simplify the valuation of a derivative contract, develop a hedging strategy, evaluate a hedging strategy with respect to congestion, identify a successful bidding strategy at auctions of derivative contracts, and determine an optimal position in a multi-settlement nodal market. Moreover, techniques are also described for evaluating the matrix of Power Transfer Distribution Factors and loss factors (comprising the A matrix) that are needed to estimate the "deltas vector".

10 Claims, 11 Drawing Sheets

U.S. PATENT DOCUMENTS

| | | | | |
|---|---|---|---|---|
| 5,819,237 | A | | 10/1998 | Garman |
| 5,854,903 | A | * | 12/1998 | Morrison et al. ............ 709/249 |
| 5,905,666 | A | * | 5/1999 | Hoffman et al. ............. 700/99 |
| 5,974,403 | A | * | 10/1999 | Takriti et al. ................ 705/412 |
| 6,047,274 | A | * | 4/2000 | Johnson et al. ............. 705/412 |
| 6,105,000 | A | * | 8/2000 | Hickman et al. ............. 705/10 |
| 6,169,979 | B1 | * | 1/2001 | Johnson ...................... 705/412 |
| 6,456,982 | B1 | * | 9/2002 | Pilipovic .................. 705/36 R |
| 6,598,029 | B1 | | 7/2003 | Johnson et al. |
| 6,714,000 | B2 | | 3/2004 | Staats |
| 6,778,968 | B1 | | 8/2004 | Gulati |
| 6,922,677 | B1 | | 7/2005 | Sperandeo |
| 2002/0010670 | A1 | | 1/2002 | Mosler et al. |
| 2002/0065699 | A1 | * | 5/2002 | Talluri .......................... 705/8 |
| 2002/0152111 | A1 | * | 10/2002 | Cox et al. ..................... 705/10 |
| 2002/0165816 | A1 | * | 11/2002 | Barz .......................... 705/37 |
| 2003/0101123 | A1 | * | 5/2003 | Alvarado et al. ............. 705/36 |
| 2006/0026095 | A1 | * | 2/2006 | Alvarado et al. ............. 705/38 |
| 2006/0026096 | A1 | * | 2/2006 | Alvarado et al. ............. 705/38 |

OTHER PUBLICATIONS

"Management of Multiple Congested Conditions in Unblended Operation of a Power System" by Glavitsch et al. dated Aug. 1998, published by IEEE Transactions on Power Systems, vol. 13, No. 4, pp. 1013-1019 (pdf is pp. 1-6).*

"Primer on Electricity Futures and Other Derivatives" by Stoft et al. dated Jan. 1998 published with a Grant from the US Dept. of Energy, pp. 1-84.*

"Understanding price volatility in electricity markets" by Alvarado, F.L. and Rajaraman, R., proceedings of the 33rd Hawaii Intl. Conf. on System Sciences; 5 pages.*

"Simplified Bidding for WEPEX" by Gazalet, E.G. and Ellis, J.; dated Sep. 9, 1996; 31 pages.*

MIT EL 99-001, "Transmission Pricing and incentives for investments under Uncertainty in the Deregulated Power Industry", by Leotard, J.P., dated Jan. 26, 1999 and published in Feb. 1999; 150 pages.*

ENRON presentation at IEE Conf. titled: "Load Management: A Trading Perspective", 13 pages.*

NPL article titled: "The Dynamics of Power System Markets" by Fernando L. Alvarado dated Mar. 12, 1997 per Report No. PSerc-97-01.*

NPL article titled: "Management of Multiple Congested Conditions in Unbundled Operation of a Power System" dated Aug. 1998 in IEEE Transactions on Power Systems, vol. 13, No. 3, pp. 1013-1019 by Glavitsch, Hans et al.*

PSERC Report No. 98-27 titled: "Managing Transmission Risk: The Theory of Spatial Hedging and Arbitrage" by R. Rajaraman and F. Alvarado, dated Nov. 19, 1998; 34 pages. total including cover sheet.*

EPRI report (#TR-114276 titled: "Managing Transmission Risk", Final Report dated Dec. 1999) with the instant application's two inventors (R. Rajaraman and F.L. Alvarado) are listed amongst the team of principal investigators.*

NPL article titled: "The Dynamics of Power System Markets" by Fernando L. Alvarado dated Mar. 12, 1997 per Report No. PSerc-97-01.*

NPL article titled: "Management of Multiple Congested Conditions in Unbundled Operation of a Power System" dated Aug. 1998 in IEEE Transactions on Power Systems, vol. 13, No. 3, pp. 1013-1019 by Glavitsch, Hans et al.*

PSerc Report No. 98-27 titled: "Managing Transmission Risk: The Theory of Spatial Hedging and Arbitrage" by R. Rajaraman and F. Alvarado, dated Nov. 19, 1998; 34 pages total including cover sheet.*

EPRI report (#TR-114276 titled: "Managing Transmission Risk", Final Report dated Dec. 1999) with the instant application's two inventors (R. Rajaraman and F.L. Alvarado) are listed amongst the team of principal investigators.*

"Understanding price volatility in electricity markets" by Alvarado, F.L. and Rajaraman, R., proceedings of the 33rd Hawaii Intl. Conf. on System Sciences; 5 pages.*

"Simplified Bidding for WEPEX" by Gazalet, E.G. and Ellis, J.; dated Sept. 9, 1996; 31 pages.*

MIT EL 99-001, "Transmission Pricing and incentives for investments under Uncertainty in the Deregulated Power Industry", by Leotard, J.P., dated Jan. 26, 1999 and published in Feb. 1999; 150 pages.*

ENRON presentation at IEE Conf. titled: "Load Management: A Trading Perspective", 13 pages.*

"Primer on Electricity Futures and Other Derivatives" by S. Stoft et al., LBNL-41098, UC-1321.

"Pricing Scarce Transmission In a Bilateral Market" by S. Stoft, Jan. 31, 1998.

"The Organization of Competitive Wholesale Power Markets and Spot Price Pools" by P. Centolella, National Council: Electric Utility Restructuring/1996, http://eande.lbl.gov/ea/NationalCouncil/pubs/pool.html, pp. 1-35.

"Solving Power Flow Problems with a Matlab Implementation of the Power System Applications Data Dictionary" by F. Alvarado, Proceedings of HICSS-32, the Hawaii International Conference on System Sciences, Maui, Hawaii, Jan. 5-8, 1999.

"A Market Mechanism For Electric Power Transmission" by Hung-Po Chao et al., Journal of Regulatory Economics; 10:25-59 (1996).

"The Dynamics of Power System Markets" by F. Alvarado, PSerc-97-01, pp. 1-22.

"Management of Multiple Congested Conditions in Unbundled Operation of a Power System" by H. Glavitsch et al., IEEE Transactions on Power Systems, vol. 13, No. 3, Aug. 1998, pp. 1013-1019.

"FTR Auction User's Guide", Revised Apr. 9, 1999.

"Location-Based Trading and Risk Management" by F. Alvarado et al., EPRI Innovating Pricing Conference, Washington, DC, Jun. 1998, pp. 1-18.

"Bidder's Policy and Procedures Guide: 1999 Firm Transmission Rights Auction", California ISO, Nov. 2, 1999.

"FTR Primary Auction Winners" by V. Kasarjian—ISO Market Operations, Nov. 23, 1999.

Financial Information Form (For Establishing or Testing an EDI/Fedwire Connection to the ISO).

"Firm Transmission Rights: Secondary Market Participant Registration Form" California ISO.

http://www/caiso.com/aboutus/infokit/HowItWorks.html, Dec. 7, 1999.

"Client Services", http://www/caiso.com/clientserv/.

"Users Guide for Caiso SRS Web Sites" by W. Lee, California ISO, Dec. 6, 1999, pp. 1-6.

"PJM Markets: FTR Auctions", http:www.pjm.com/energy/ftr/ftrauc.html.

"Firm Transmission Rights Information", http://www.caiso.com/clientserv/ftr/.

"Market Operations", http://www.caiso.com/marketops/.

"Secondary Markets Procedures Guide: 2000 to 2001 Firm Transmission Rights", California ISO, Nov. 15, 1999.

FTR Settlement.

"Template Usage Examples for Secondary Registration System SRS), Firm Transmission Rights (FTR's) and Existing Transmission Contracts (ETC's)", California ISO, Mar. 16, 1999.

* cited by examiner

| Node | Flowgates 7→14 | 4→5 | 2→3 | 9→12 |
|---|---|---|---|---|
| 1 | 0 | 0 | 0 | 0 |
| 2 | 0.25 | 0.48 | -0.29 | 0.17 |
| 3 | 0.29 | 0.52 | 0.71 | 0.39 |
| 4 | 0.19 | -0.20 | 0.05 | -0.08 |
| 5 | 0.30 | 0.80 | 0.07 | 0.21 |
| 6 | 0.32 | 0.54 | 0.37 | 0.51 |
| 7 | -0.20 | 0.03 | 0.04 | 0.02 |
| 8 | 0.17 | -0.08 | 0.05 | -0.08 |
| 9 | 0.30 | 0.22 | 0.06 | -0.19 |
| 10 | 0.33 | 0.50 | 0.30 | 0.61 |
| 11 | 0.60 | 0.16 | 0.06 | 0.03 |
| 12 | 0.36 | 0.41 | 0.15 | 0.81 |
| 13 | 0.62 | 0.17 | 0.07 | 0.10 |
| 14 | 0.80 | 0.10 | 0.06 | 0.08 |
| 15 | 0.50 | 0.24 | 0.09 | 0.25 |
| 16 | 0.43 | 0.33 | 0.12 | 0.53 |

METHOD FOR MANAGING RISK IN MARKETS RELATED TO COMMODITIES DELIVERED OVER A NETWORK

RELATED APPLICATION

The present application is a Continuation of U.S. Ser. No. 10/118,330, filed Apr. 9, 2002, which is a Continuation-In-Part of the U.S. patent application Ser. No. 09/522,709, filed Mar. 10, 2000, entitled "METHOD FOR MANAGING RISK IN MARKETS RELATED TO COMMODITIES DELIVERED OVER A NETWORK", which claims the benefit of U.S. Provisional Patent Application Ser. No. 60/123,823 filed Mar. 11, 1999, the contents of each of which are incorporated by reference in their entirety. The present application also claims benefit of U.S. Provisional Patent Application Ser. No. 60/330,594 filed Oct. 25, 2001, entitled "MANAGING AND EVALUATING TRANSMISSION CONGESTION RISK IN ELECTRICITY DERIVATIVE CONTRACTS", filed Oct. 25, 2001, the contents of which are incorporated by reference in their entirety.

FIELD OF THE INVENTION

The present invention relates to financial services and more particularly to a system and method for managing risk in markets related to commodity delivery over a network.

BACKGROUND OF THE INVENTION

For many years, electric power and communications utilities operated in a highly regulated market. As these and similar industries are restructured, deregulated, and created, new competitive commodity markets are coming into existence in which prices are determined by supply and demand. For example, regulated utilities historically sold wholesale power under cost-based tariffs with retail prices set on a cost-plus fixed-return basis. As a result, these utilities had no incentive to manage the risk of potential changes in the price of the power they generated. Users of power similarly had no incentive to manage price risk because they had no control over the price they paid for power. The shift to a competitive market, however, has created an increasing awareness of electricity price risk and the need for managing the price risk.

The need for managing the price risk of electricity is greater than in many other markets because there is a high variation in the price of electricity over both time and space. There is a high variation in the price of electricity over time because it is difficult to store electric power, necessitating that the electricity be produced when demanded. Even under normal conditions, electricity prices may fluctuate widely over the course of a day.

The high variation in the price of electricity over space is due to the physical nature of the power network. The power flow over a particular transmission line between two locations in an electric power network cannot be directly controlled unless highly specialized and generally expensive equipment is installed due to the laws of physics, according to which electric power flows over all possible paths in accordance with their impedance. For example, the 1989 Federal Energy Regulatory Commission (FERC) transmission task force discovered that as much as 50 percent of a power transfer from Ontario Hydro to the New York Power Pool may have used transmission lines that were hundreds of miles away from the direct interconnection between the two locations. As a result, when electric power is transferred into or out of the power transmission grid, that transfer of power may affect the distribution of electricity on any transmission line in the network.

Congestion in the transmission system can have a significant effect on the price of electricity. When one transmission line in the network is loaded to its full capacity, power cannot be rerouted over a different transmission line to avoid the congested line. Even if the transmission of power is congested between only two locations, that congestion affects the prices of electricity at other locations in the network. The price of electricity downstream of the congested line tends to increase, encouraging additional power generation to be brought on line to serve the load downstream of the congested line. Meanwhile, the price of electricity upstream of the congested line will tend to decrease, discouraging power generation upstream of the congested line.

Various approaches have been proposed to manage the price risk of electricity. For example, a generator can hedge against the risk that the price of electricity will fall at a particular electricity location via a forward contract. A power forward contract is a privately negotiated agreement between commercial parties containing a binding obligation to deliver electricity at a specified location and price. A significant disadvantage of forward contracts is that the market for forward contracts can be illiquid at particular locations. Forward markets achieve higher liquidity by concentrating the market activity into a few standard locations. There are thousands of different locations in the power network but only a few locations in which any forward liquidity exists. Therefore, it may be difficult for the generator to find a willing buyer of the forward contract at an acceptable price at their specific location.

Futures contracts are generally standardized contracts for the delivery of a commodity (here, electricity) in the future at a price agreed upon when the contract is made. Because futures contracts are used primarily for hedging against price risk or speculating on the price of the commodity, market participants typically close out their futures contracts positions financially rather than through delivery. In the PJM (Pennsylvania, New Jersey, and Maryland) market, which has over 1000 locations, an electricity futures market currently exists for delivery only at the location PJM West.

Because the location for which a liquid forward and futures market exists is typically not the same location at which a particular market participant, such as a power generator, would like to make or take delivery, market participants using forward contracts to hedge their underlying positions incur basis risk because prices at different locations are not consistent. This basis risk is sometimes referred to as "Spatial Price Risk." For example, due to congestion, the price of electricity at one location may differ from the price of electricity at the liquidly traded location.

Besides forward and futures contracts, other price risk management contracts include price swaps, basis swaps, option contracts, and congestion compensation contracts. The first three types of risk management contracts are well-known outside of the wholesale electricity market. A congestion compensation contract explicitly compensates one of the parties if there is congestion on a transmission line. Various kinds of congestion compensation contracts have been proposed and are known under various names.

For example, a Transmission Congestion Contract (TCC) is a congestion compensation contract for buying power at one location and delivering the same amount of power at a different location at a specified price. The TCC pays if there is a difference in price between the two locations, or, in other words, if there is a congested line in the power network. A TCC, however, would suffer from a lack of liquidity because there are thousands of locations in the power network, leading to millions of possible TCCs, but relatively few market participants would be interested in any particular TCC.

As another example, Stoft proposed a futures contract, not on the price of electricity at a particular location, but on an explicit congestion price for delivering electricity between two locations. The explicit congestion price values the use of scarce transmission resources, such as a congestible transmission line. A disadvantage of this approach is that market participants are used to locational prices for electricity, not congestion prices for the transmission of electricity.

Other kinds of congestion compensation contracts include a Fixed Transmission Right (FTR) available from PJM, which is a financial contract that entitles the holder to a stream of revenues (or charges) based on a reservation level and hourly energy price differences across a specific path. The California Independent System Operator (ISO) has a hybrid contract called a "Firm Transmission Right" (also FTR) that combines features of FTRs and forward contracts. The markets for these and other congestion compensation contracts are not as liquid as the futures market and may be vulnerable to arbitrage. Moreover, spatial price variation (i.e., basis risk) makes it difficult to evaluate the price of congestion compensation contracts.

Therefore, there is a need for a technique to manage the price risk for electricity at a particular location that both uses liquid price risk instruments and accounts for spatial price variation. There is also a need for a method of evaluating the price of congestion compensation contracts and other price risk instruments, including forward and futures contracts. There also exists a need for identifying arbitrage conditions of price risk instruments for electricity, either to avoid being arbitraged or to profit from arbitrage.

SUMMARY OF THE INVENTION

These and other needs are addressed by the present invention, in which a combination of multiple price risk instruments, e.g. futures contracts, congestion compensation contracts, etc., is selected in a particular proportion that reduces or even eliminates the Spatial Price Risk associated with congestion. In contrast with other techniques, the price risk instruments need not be traded at the location in which the market participant is interested; thus, the market participant is free to choose among the most liquid of the available price risk instruments, such as futures contracts and possibly FTRs.

The present invention stems from the realization that the Spatial Price Risk is almost completely associated with the congestion prices associated with potentially congestible lines at a prospective time T in the future. From these congestion prices, the physics of the power flows dictates the pattern of locational prices of electricity within the network at the prospective time T, enabling any portfolio or combination of price risk instruments in the electricity market to be evaluated. More specifically, it is discovered that the cost f for a portfolio y of price risk instruments with respect to a market participant's underlying position z in the market at the prospective time T, can be described by the following equation:

$$f = (z'A - y'P'A)\lambda + y'F, \quad (1)$$

where A represents distribution factors describing the physics of the power flows in the network as discussed in greater detail hereinafter, $\lambda$ represents the congestion prices associated with the congestible lines at the prospective time T, P represents the available market of price instruments (e.g. futures contracts, congestion compensation contracts, and other preferably liquid contracts in a market related to electricity), and F represents the current prices (for delivery at prospective time T) of the price risk instruments.

Since the Spatial Price Risk is associated with the congestion prices $\lambda$ and since the cost F of the price risk instruments is currently known, the market participant's Spatial Price Risk can be reduced or even eliminated by eliminating the role of $\lambda$ in equation (1). In other words, to eliminate Spatial Price Risk the portfolio y of price risk instruments should be chosen such that:

$$z'A - y'P'A = 0. \quad (2)$$

Accordingly, one aspect of the invention relates to a method and software for managing risk in a market related to a commodity, such as electricity, delivered over a network. Locational prices of the commodity in the market are modeled as a linear combination of congestion prices associated with congestible lines in the network. Based on the model, a combination of price risk instruments for the market is produced in a proportion such that the effect of the congestion prices associated with the congestible lines on the locational prices of the commodity is reduced, or even eliminated.

Another aspect of the invention pertains to a method and software for evaluating a portfolio of price risk instruments in a market related to a commodity delivered over a network, such as electricity. A plurality of distribution factors is estimated that indicates the effects on one or more congestible lines in the network due to transfers of the commodity at respective locations in the network. The portfolio is then evaluated based on the estimated distribution factors. Other aspects of the invention involve a method for hedging a set of underlying positions in the market and identifying arbitrage opportunities by producing a portfolio of price risk instruments for the market based on the estimated distribution factors.

Still another aspect of the invention is related to portfolios derived by the above described methods or to any portfolio of price risk instruments in which the price risk instruments are proportioned such that the effect of congestion prices associated with at least some congestible lines in the network on the prices of the commodity at locations in the network is eliminated.

Other advantages of the present invention will become readily apparent from the following detailed description, simply by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A methodology for managing risk in markets related to commodities delivered over a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
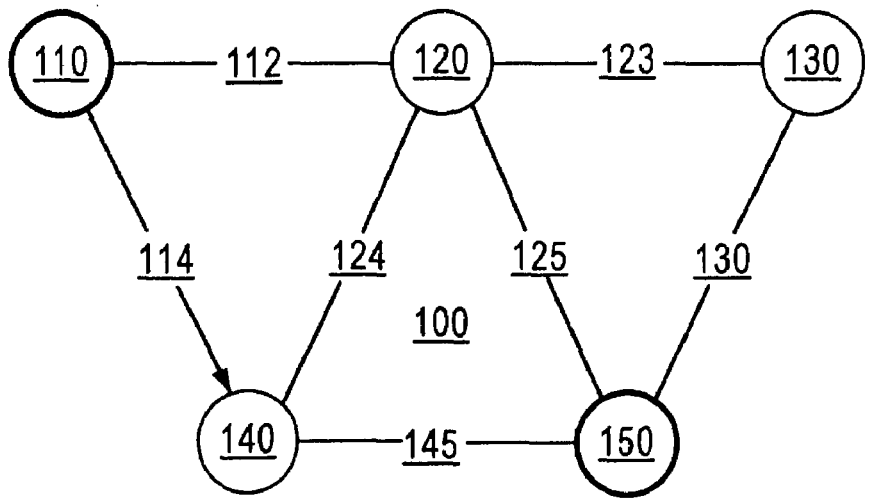
FIG. 1 depicts an exemplary power network.

In addition, the operation of embodiments of the present invention is illustrated with respect to an exemplary power network 100 shown in FIG. 1. The present invention is not limited to the exemplary power network shown in FIG. 1, but is capable of application to other network configurations and topologies, including existing power distribution networks comprising thousands of locations.

The exemplary power network 100 comprises, for purposes of explanation, five locations or "nodes", 110, 120, 130, 140, and 150. Node 110 is coupled to node 120 by transmission line 112 and to node 140 by transmission line 114. Node 120 is further coupled to node 130 by transmission line 123, to node 140 by transmission line 124, and to node 150 by transmission line 125. Nodes 130 and 140 are further coupled to node 150 by transmission lines 135 and 145, respectively.

For most examples discussed herein, it is further assumed that there exists the possibility of transmission congestion in transmission line 114 in the direction marked by the arrow, namely from node 110 to node 140. Furthermore, it is assumed that two liquid forward electricity markets or futures markets exist, based on prices at the locations of nodes 110 and 150, marked by a heavier line. Finally, it is also assumed that there are no transmission losses. Departures from this basic example, however, will be made to more fully explain the operation of particular embodiments of the present invention.

Modeling Locational Prices in the Network

Figures 2, 3:
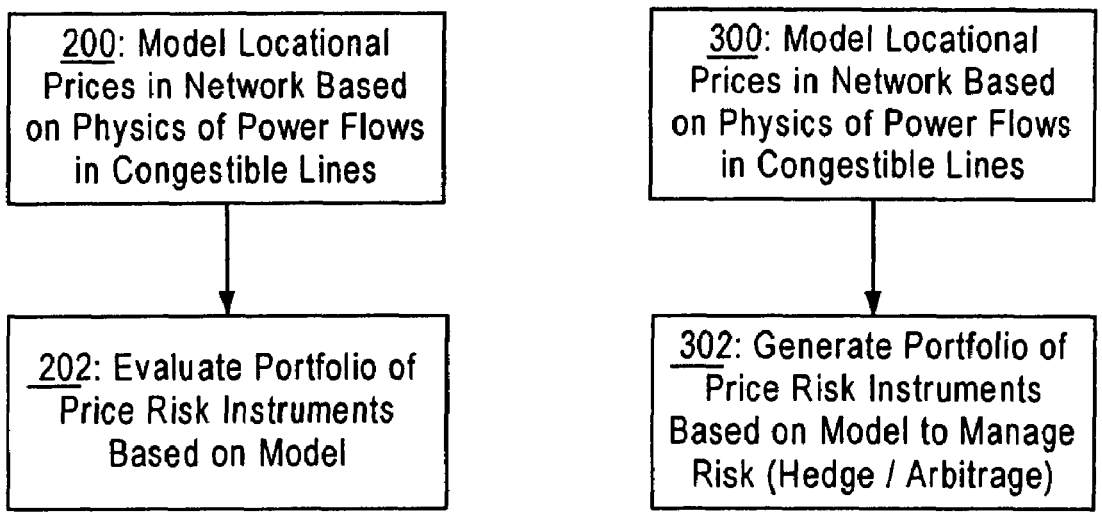
FIG. 2 is a flow diagram illustrating the operation of one embodiment of the present invention.
FIG. 3 is a flow diagram illustrating the operation of another embodiment of the present invention.

FIGS. 2 and 3 are flow diagrams illustrating the operation of different embodiments of the present invention, for example, to evaluate a portfolio of price risk instruments (see FIG. 2) or to generate portfolios of price risk instruments (see FIG. 3). In either case, the locational prices in the network are modeled at an initial step 200 or 300, respectively, based on the physics of power flows in relation to congestible lines.

The present invention stems from the realization that the physics of power flows in an electric power network governs the pattern of electricity prices at the multiple locations in the electric power network when one or more distribution and/or transmission lines are congested, even at a prospective time T in the future. More specifically, the pattern of locational prices can be derived from a linear combination of the congestion prices and the price of electricity at one "reference" location. Thus, the locational spot prices in the electric power network can be estimated by estimating the congestion prices, for example, by use of the following equation:

$$S = A\lambda, \quad (3)$$

where S represents the pattern of spot location prices in the power network at the prospective time T, A represents distribution factors describing the physics of the power flows in the network, and $\lambda$ represents the prices of congestion associated with the congestible lines at the prospective time T.

In one embodiment, A is an $(l+1) \times n$ sensitivity matrix, where l represents the number of congestible transmission lines, referred to as "flowgates," and n represents the number of locations or nodes in the network. The first column of A describes the effect of transmission losses on transfers of electricity. In particular, each entry of the first column of A equals one plus the percentage of transmission losses that occur when an incremental transfer of electricity is made between a reference location and the location corresponding to the entry. In the special case when the power network has no transmission losses, the first column of A is all "ones."

Each of the remaining columns of A contains Power Transfer Distribution Factors (PTDFs) corresponding to each of the flowgates. Each entry of a flowgate PTDF column is the percentage of the incremental flow in the flowgate that results from a transfer of electricity between the reference location and the location corresponding to the entry. The factors can be estimated from the relative impedance of each of the transmissions, using a DC or AC load flow solution, and from sets of PTDFs available from the North American Electric Reliability Council (www.nerc.com).

Referring to the exemplary network in FIG. 1, n=5 because there are five nodes 110, 120, 130, 140, and 150, and l=1 because there is only one flowgate, namely, congestible transmission line 114 in the direction from node 110 to node 150. Since it is assumed for purposes of example that transmission lines 112, 114, 123, 124, 125, 135, and 145 are lossless, the first column of A is all ones. The second column of A contains the PTDFs corresponding to the flowgate 114. For example, if an additional one megawatt is injected at node 110 and removed at node 120, and if 38% of the injected power will flow through transmission line 114, then the corresponding entry for node 120 in the matrix A will be 0.38. The examples discussed hereinafter assume for purposes of illustration the following values in sensitivity matrix A:

$$A = \begin{bmatrix} 1.00 & 0.00 \\ 1.00 & 0.38 \\ 1.00 & 0.43 \\ 1.00 & 0.62 \\ 1.00 & 0.48 \end{bmatrix}. \quad (4)$$

Furthermore, $\lambda$ is an $(l+1)$-dimensional vector that characterizes the congestion prices in the network, and may be based on the Lagrange multipliers corresponding to the power flow equations and flowgate congestion constraints. The first entry of $\lambda$ is the spot price of electricity at the reference node, and the remaining entries of λ are the prices of congestion with respect to the reference node of the l congestible lines. When one or more of the l flowgates are congested, the corresponding entries in λ become positive, but if the flowgate is not congested, the corresponding entry in λ is zero.

There is uncertainty in λ because there is uncertainty in whether there will be transmission congestion in the future. On the other hand, there is little or no reasonable uncertainty in the sensitivity matrix A, because market participants can infer the values of A from market observations, calculations based on a knowledge of the network and the application of the laws of physics, and information published by various organizations (such as NERC). Therefore, the uncertainty in locational prices is almost completely due to the uncertainty in λ, and the effect of spatial risk in one's portfolio can be reduced or even eliminated, by reducing the role of the parameter λ.

In the example, there is only one congestible transmission line, flowgate 114. Thus, λ would be a two element column vector $[\lambda_1, \lambda_2]'$, where $\lambda_1$ represents the spot price of electricity at node 110, and $\lambda_2$ represents the congestion price for flowgate 114. If the spot price for electricity at node 110 is $\lambda_1$=\$20.00, and if there is no congestion in flowgate 114, i.e. $\lambda_2$=\$0.00, then the spot prices in the network 100 is S=[20.00, 20.00, 20.00, 20.00, 20.00]'. This example shows that there is no spatial variation in price if there is no congestion.

On the other hand, if there is congestion on flowgate 114, then the second entry of λ assumes a positive value. Assuming that the spot price for electricity at node 110 is still $\lambda_1$=\$20.00 but that the congestion price for flowgate 114 is $\lambda_2$=\$10.00, for example, the spot prices in the network 100 become is S=[20.00, 23.80, 24.30, 26.20, 24.80]'. The higher spot price at node 140, $S_4$=\$26.20, will encourage generators attached to node 140 to supply more power at node 140, thereby reducing the congestion on transmission line 114.

Evaluating Portfolios

Referring to FIG. 2, after modeling in step 200 the locational prices in the network 100, a portfolio of price risk instruments is evaluated based on the model (step 202). As used herein, a portfolio is a set of positions to take financial advantage of particular market conditions or characteristics. The financial advantage may be to hedge against risk, in which the value of the portfolio is generally negative, or to assume risk, in which the value of the portfolio hopefully is positive. A position is a specific asset or obligation traded in a market related to a commodity delivered over a network, such as the wholesale electricity market, the electricity derivatives market, and related markets. A price risk instrument refers to a position taken for delivery or settlement at a prospective time T in the future in the market and may include, for example, forward contracts, futures contacts, congestion compensations contracts, such as TCCs and FTRs, price swaps, basis swaps, option contracts, and other derivative contracts.

The m available price risk instruments for a network may be expressed as an n×m matrix P in terms of a weighted average of the prices at the n locations in the market. A futures contract for delivering power at a particular location would have a 1.0 for that location and a 0.0 elsewhere. A TCC, on the other hand, would have a 1.0 at the location where power is added and a −1.0 where power is removed. In the example of FIG. 1, there are two futures markets, one for delivering electricity at node 110 and another for delivering electricity at node 150. Thus, P defined for the example as:

$$P = \begin{bmatrix} 1.0 & 0.0 \\ 0.0 & 0.0 \\ 0.0 & 0.0 \\ 0.0 & 0.0 \\ 0.0 & 1.0 \end{bmatrix}. \tag{5}$$

The market participant's underlying position in the market may be given as an n-dimensional vector z indicating the buy and sell obligations at a prospective time T in the future. Positive values in z represent net load (or buy) obligations, and negative values represent net generation (or sell) obligations. Generally, z will have non-zero values for a market participant who would like to hedge a particular underlying position, and all zeros for a speculator whose primary interest is assuming price risk.

The market participant's underlying position z at the prospective time T in the future may be met by taking positions x in the spot market at time T, by taking positions y with price risk instruments (e.g. in a futures market now for delivery or settlement at time T), or a combination of both. Thus, $$z = x + Py. \tag{6}$$

The cost $f$ to a market participant of a portfolio is given by (where negative $f$ implies profits and prime denotes transposition):

$$f = x'S + y'F, \tag{7}$$

where F is an m-dimensional vector that represents the prices of the respective price risk instruments. Combining equations (3), (6), and (7), the resulting formula for calculating the cost $f$ of a portfolio y of price risk instruments in relation to the market participant's underlying position can be given by:

$$f = (z'A - y'P'A)\lambda + y'F. \tag{8}$$

In the example, if a market participant has a set of buy/sell obligations z=[2, −1, 2, −3, 1]', the cost for the market participant to meet all the obligations in the spot market at time T (i.e. y=0) would be $f$=z'Aλ. If the spot price for electricity at node 110 at time T is \$20.00/MW and there is no congestion, then λ=[20.00, 0.00]' and, therefore, $f$=\$20.00. However, with the same spot price for electricity at node 110 of \$20.00/MW, if there is congestion on transmission line 114 with a congestion price of \$10.00/MW, then λ=[20.00, 10.00]' and, therefore, $f$=\$11.00. The price swing of \$9.00/MW shows that there is considerable Spatial Price Risk due to congestion.

If the market participant takes a long (buy) position of 1 MW at time 0 for delivery at time T in the futures market for node 110, with the prices of futures given by F=[20.00, 22.00], then the cost in the first scenario of λ=[20.00, 0.00]' is also \$20.00/MW, but the cost in the second scenario of λ=[20.00, 10.00]' is \$11.00/MW. Thus, there still is a price swing of \$9.00/MW, showing that taking the position in a single price risk instrument has not reduced, in this example, the spatial risk due to congestion.

Hedging

Referring to FIG. 3, another aspect of the present invention pertains to modeling the electric power network (step 300) and then generating a portfolio to manage risk, for example, by hedging, constructing new price risk instruments, and identifying low-risk arbitrage opportunities.

One embodiment of the invention therefore relates to hedging against the risk of an underlying position, which means reducing the price risk for fulfilling the underlying position at a prospective time T in the future. Referring back to equation (8), since the cost of the price risk instrument F is known at time 0, the second term y'F is not subject to risk. All the spatial risk, thus, is associated with the uncertainty in the congestion price vector $\lambda$. To eliminate the spatial risk, therefore, the portfolio y of price risk instruments is chosen such that term with the congestion price vector $\lambda$ becomes zero, or $$z'A - y'P'A = 0. \tag{9}$$

To fulfill the remainder of the underlying position z at prospective time T, the market participant takes the position z−P y in the spot market at time T. The hedge costs y'F.

Equation (9) may be viewed as a linear equation in y, the market participant's portfolio of price risk instruments. If m (the number of price risk instruments) is strictly less than l+1 (one more than the number of congestible transmission lines), then there are too many equations in too few unknowns, and equation (9) will not usually be satisfied. In this case, however, the market participant may make a "partial hedge" by selecting a number of possible congestion events that is less than the number of price risk instruments. Accordingly, the market participant reduces exposure to the selected congestion events, while still remaining subject to the risk of the non-selected congested events.

On the other hand, if m is strictly greater than l+1, then there are too few equations and too many unknowns, and equation (9) will be satisfied for many different portfolios y. In fact, the presence of too many m price risk instruments will lead to the possibility of arbitrage.

Finally, if m equals l+1, there are as many equations as there are unknowns, and equation (9) will usually have a unique solution y. Equation (9) will also have a solution if z'=y'P', which for an arbitrary z will have solution if and only if P is invertible or m=n. Therefore, complete hedging is available when the number of available price risk instruments is greater than the number of congestible transmission lines, i.e. m≧l+1, or when the number of price risk instructions equals the number of locations, i.e. m=n.

In the example, there are two futures markets (i.e., m=2) at nodes 110 and 150, but only one congestible line 114 (i.e., l=1). Therefore, there exists the possibility of complete hedging of the market participant's underlying position of buy/sell obligations z=[2, −1, 2, −3, 1]'. Solving for y in z'A−y'P'A=0, the solution y=[2.9, −1.9]' is obtained. A variety of matrix algebra and linear optimization techniques may be employed to solve for y, for example, by use of the MATLAB™ software package, but the present invention is not limited to any particular technique.

Accordingly, the market participant would take a long (buy) position (2.9 MW) in the futures market at node 110 and a short (sell) position (−1.9 MW) in the futures market at node 150 for delivery or settlement at time T. The cost of the hedge is y'F=$16.20, which is the total cost to the market participant if there is no congestion (e.g., $\lambda$=[20.00, 0.00]') or even if there is congestion (e.g., $\lambda$=[20.00, 10.00]'). Since the cost is always the same, notwithstanding the congestion of flowgate 114, the Spatial Price Risk is completely eliminated. While the risk is completely eliminated, the hedge will not necessarily leave the market participant better off than if the market participant had only participated in the spot market. In the example, with $\lambda$=[20.00, 10.00]', the market cost is $11.00, but the hedge cost $16.20. The reason why the market participant chooses to hedge, however, is for risk aversion, not profit maximization.

Synthetic Price Risk Instruments

Hedging is generally favored by those market participants, such as utilities, that have a known underlying position in the actual commodity market in the form of power generation and load obligations against which the market participant would like to eliminate price risk. The principles described herein above, however, can also help brokers, dealers, financial institutions, and other financial services providers in offering new price risk instruments, even at locations that are not actively traded on the market.

A financial services provider who offers a new price risk instrument in effect creates an underlying position z in the commodity and related markets reflective of the new price risk instrument. Thus, the financial services provider can use equation (9) to hedge against that new underlying position z with price risk instruments at other locations to eliminate the price risk for the financial services provider. The price of the hedge will then determine the price at which the new price risk instrument should be offered. The new price risk instruments may include TCCs and other congestion compensation contracts at locations that are not actively traded on the market. A buyer's choice contract, which grants the right to get power from any of a plurality of locations in the network, can also be constructed.

In the example illustrated in FIG. 1, suppose a financial services provider wishes to offer a 1 MW Transmission Congestion Contract (TCC) from node 130 to node 120. A TCC from one location to another pays the difference in the price of electricity at the two locations, and can be used by others to hedge against risk. Thus, the underlying position of the TCC is z=[0, −1, 1, 0, 0]'. Using A and P defined in equations (4) and (5), respectively, and equation (9), the portfolio of existing price risk instruments to hedge against the TCC is chosen as y=[−0.1, 0.1]. In other words, the financial services provider should take a long position of 0.1 MW at node 150 and a short position of −0.1 MW at node 110. The cost of this synthetic TCC would be y'F=$0.20.

Arbitrage

If a financial services provider is not careful in offering a new price risk instrument at the appropriate price, that financial services provider may become vulnerable to arbitrage. Arbitrage is the purchase of various financial instruments for a given time to profit from a price discrepancy. In accordance with one aspect of the present invention, an arbitrage condition exists among the electricity market related price risk instruments if there exists a portfolio y such that the following conditions are satisfied:

$$y'P'A = 0 \text{ and } y'F < 0. \tag{10}$$

The first condition follows from equation (9), in which the arbitrageur has no actual underlying position (i.e., z=0) in the market, but wishes to take a set of positions y to take financial advantage of the market. The second condition merely states that the cost of the arbitrage portfolio y is profitable. The first arbitrage condition is satisfied when either the rows of P'A or the rows of P' are linearly dependent, which generally occurs when m (the number of available price risk instruments) exceeds l+1 (one plus the number of congestible transmission lines) or exceeds n (the number of locations in the network). In other words, if there are "too many" electricity price risk instruments, then there is a possibility of arbitrage.

To illustrate, assume that, in addition to price risk instruments offered in the example of FIG. 1, a 1 MW TCC is also offered from node 140 to node 130 at a price of $0.10. Thus, the matrix of available price risk instruments becomes:

$$P = \begin{bmatrix} 1 & 0 & 0 \\ 0 & 0 & 0 \\ 0 & 0 & -1 \\ 0 & 0 & 1 \\ 0 & 1 & 0 \end{bmatrix}. \quad (11)$$

Furthermore, assume that the future prices of these three markets are F=[20.00, 21.00, 0.10]'. The cost of the TCC is normally considerably lower than the energy supply contracts, because the TCC does not involve energy per se, but rather the transfer of energy. If there is no congestion, for example, the energy transfers offset at the same price and the value of the TCC is zero. Based on these values of P, A, and F, it is possible to find a portfolio y of the three price instruments y=[1.0, −1.0, 2.5]', such that closing out this position at time T will generate a guaranteed profit of $0.75. If, however, the TCC was offered at the price of $0.40 (determined by the methodology described with respect to creating synthetic price risk instruments), then the value of the arbitrage portfolio would be $0.00, indicating that the TCC is appropriately priced.

Unlike other market participants, such as utilities, arbitrageurs are generally willing to give up the elimination of Spatial Price Risk if they can always make a profit in every congestion scenario, even when the profit is variable. Accordingly, arbitrageurs would seek to find a portfolio y such that the following generalized conditions hold for all congestion scenarios Λ:

$$-y'P'A\lambda + y'F \leq 0, \text{ for all } \lambda \text{ in } \Lambda \quad (12)$$

with the above inequality being strict for at least one member of Λ.

Options and Other Derivative Contracts

Options and other derivative contracts differ from the previously discussed price risk instruments in that their value is not linear. For example, an option grants the right but not obligation to buy a commodity at a specified "strike" price. Thus, if the price of the commodity is less than the strike price, then the option will not be exercised unless the option holder would like to take a guaranteed loss. On the other hand, the option holder will exercise the option if the price of the commodity exceeds the strike price, because the option holder can lock in a profit. Consequently, the valuation of an option needs to take into account the expected values of the commodity prices to estimate the likelihood that the strike price will be exceeded.

Accordingly, an aspect of the present invention extends the evaluation of price risk instruments for options and other non-linear derivatives in equation (8) to account for the expected variation of congestion prices:

$$f = (z' - y'P')A\hat{E}(\lambda(T)) + y'F, \quad (13)$$

where $\hat{E}(\lambda(T))$ represents a risk-neutral expectation for the congestion prices at time T. In one embodiment, the congestion is modeled by a combination of a Wiener process and a Poisson jump process to arrive at the following analytical solution:

$$\hat{E}(\lambda_i(T)) = \quad (14)$$
$$\lambda_i(0)e^{-\beta_i^- T} + \left(1 - e^{-\beta_i^- T} - \frac{\beta_i^-}{\beta_i^- + \beta_i^+}\left(1 - e^{-(\beta_i^- + \beta_i^+)T}\right)\right)E(u_i),$$

where $\beta_i^-$ and $\beta_i^+$ represent the mean arrival rates of the Poisson jump and death processes, respectively, which may be obtained using moment matching techniques on probability distributions of other options, and $E(u_i)$ represents an expected Poisson random jump size.

Hardware and Software Overview

Figure 4:
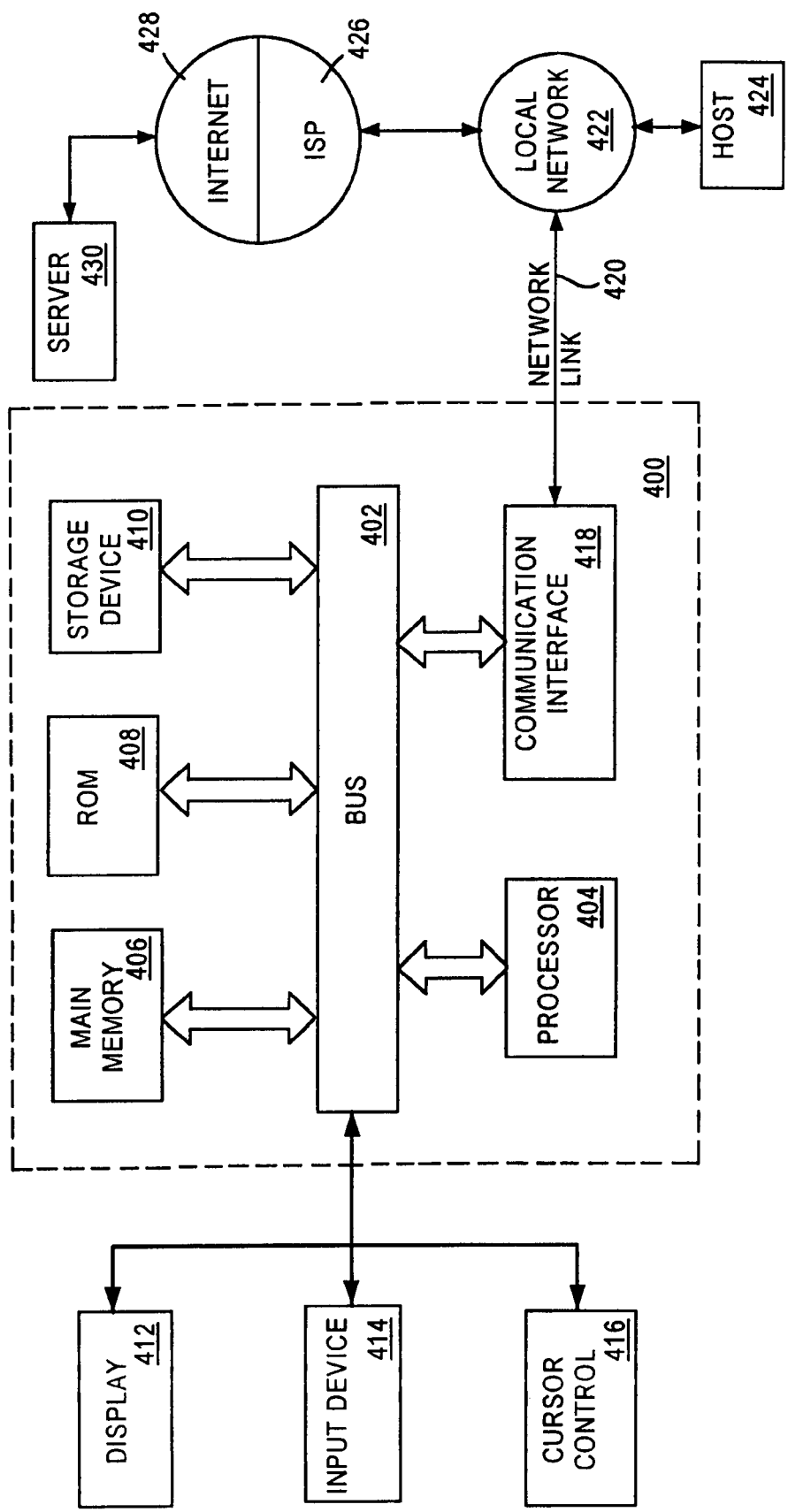
FIG. 4 depicts a computer system that can be used to implement an embodiment of the present invention.

In certain embodiments, execution of one or more steps in FIGS. 2 and 3 may be automated on a computer system, which can be, for example, a mainframe computer, minicomputer, workstation, personal computer, a web server, a thin client, and an Internet appliance. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

One embodiment of the invention is related to the use of computer system 400 for trading. According to one embodiment of the invention, trading is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media include, for example, optical or magnetic disks, such as storage device 410. Volatile media include dynamic memory, such as main memory 406. Transmission media include coaxial cables, copper wire and fiber optics, including the wires that comprise bus 402. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network, now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420, and communication interface 418. In the Internet example, a server 430 might transmit a requested code for an application program through Internet 428, ISP 426, local network 422 and communication interface 418. In accordance with the invention, one such downloaded application provides for trading as described herein. The received code may be executed by processor 404 as it is received, and/or stored in storage device 410, or other non-volatile storage for later execution. In this manner, computer system 400 may obtain application code in the form of a carrier wave.

Accordingly, a system, method, software, and portfolios for managing risk in markets relating to a commodity delivered over a network are described. More specifically, techniques are disclosed, wherein a market participant can construct portfolios of preferably liquid price risk instruments in specific proportions such that the price risk for the market participant's underlying position is reduced or even eliminated for contemplated congestion conditions. In addition to hedging, market participants can construct and properly evaluate new price risk instruments, as well as identify arbitrage opportunities among offered new price risk instruments whose prices are not reflective of the physics of power flows.

Further Developments and Improvements

The valuation and hedging of a locational derivative electricity contract using the methods and techniques of the present invention have particular benefits because, typically, only a few locational derivative contracts are likely to be openly traded.

In this analysis, the market participant is interested in one or more of the following objectives:

1. What is the fair market value of an electricity derivative contract?
2. How should the risks associated with a particular derivative contract be managed by taking one or more positions in each of m traded derivative instruments?
3. Are there any arbitrage possibilities?

Figure 6:
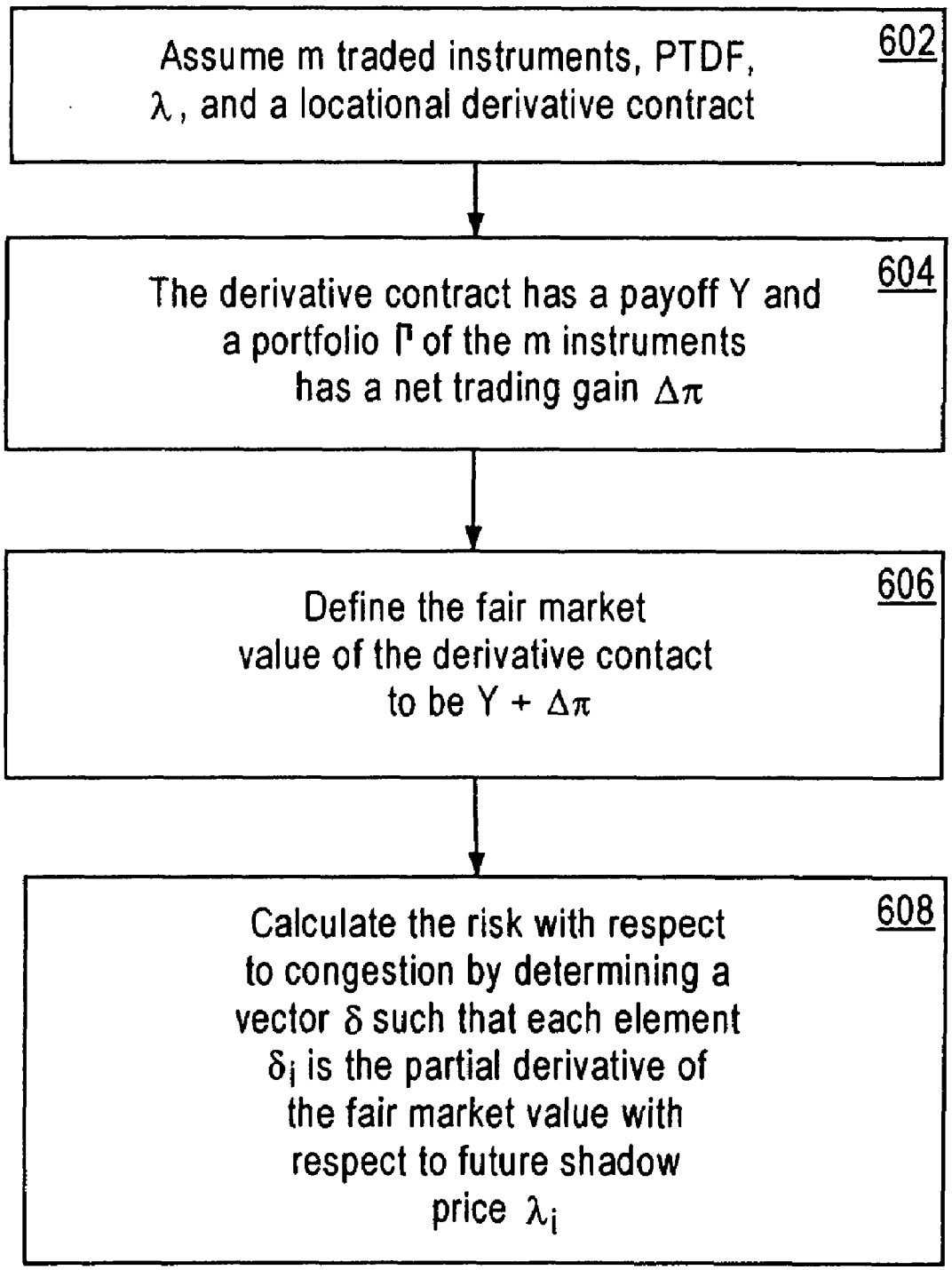
FIG. 6 depicts a flowchart for implementing an exemplary method for evaluating the risk of a derivative contract.

FIG. 6 illustrates a flowchart for performing the initial steps in valuation and hedging decisions involving derivative contracts according to embodiments of the present invention. The analysis begins in step 602 by assuming that there are m traded electricity locational derivative contracts or instruments having liquidity. In a preferred embodiment, the settlement of such derivative instruments is based on the spot prices at the n nodes of the distribution system. The present invention, however, also contemplates an alternative embodiment in which the electricity transmission derivative instruments depend upon other commodities such as, for example, natural gas.

A derivative contract, as indicated in step 604, has an associated payoff, Y. This payoff is considered to be the total income received from holding the contract over a time interval [0, T].

A trading strategy, or portfolio, $\Gamma$ is a set of buy and/or sell positions adopted by a market participant from among the set of m liquid tradable instruments over the time interval [0, T]. Portfolios, $\Gamma$, are typically classified as linear or nonlinear. A portfolio is linear if its payoff is a linear combination of the values of the spot prices (which is equivalent to a linear combination of the underlying future shadow prices, $\lambda$). A portfolio is nonlinear if its payoff is a nonlinear function of the underlying future shadow prices $\lambda$.

One example of a linear portfolio is a portfolio which consists of some combination of long and short positions in the underlying m tradable instruments. An example of a nonlinear portfolio is an option. The value of an option generally involves the use of a MAX function which renders its value a non-linear function of the underlying tradable instrument.

The notation ΔΠ(Γ), as indicated in step 604, represents the net trading gain, over the interval [0, T], as a result of trading strategy Γ in the m electricity instruments.

Step 606 illustrates that for a particular derivative contract, having payoff, Y, if there exists a trading strategy Γ such that Y+ΔΠ(Γ) has no uncertainty (i.e., has no risk related to flowgate congestion), then the fair market value of the derivative contract (at time 0) is $$\text{fair value} = Y + \Delta\Pi(\Gamma) \quad (15)$$

In other words, the strategy Γ perfectly hedges all risk from the derivative contract and the cost of the hedging, in part, determines the fair value of the derivative contract. This fair value is said to be risk-neutral with respect to congestion in the electricity distribution flowgates.

If a risk-neutral valuation of the derivative contract does not exist, then the term Y+ΔΠ(Γ) will have congestion-related risk for the trading strategy Γ. In such a case, the risk of the derivative contract cannot be hedged perfectly and the value of the contract will depend on the market participant's risk preferences. Under these circumstances, the market participant holding the contract may subjectively prefer one hedging strategy over another after taking into account the expected trading gains, or other parameters, from each respective strategy.

Returning to equation 15, to determine the fair value of the contract, then, the risk of a trading strategy Γ will need to be quantified with respect to transmission congestion.

In the example portfolio that consists of a derivative contract, with payoff Y, and a trading strategy Γ, this risk is quantified in step 608 using a "deltas" vector $\delta = [\delta_1, \delta_2, \ldots \delta_{l+1}]'$ where $$\delta_i = \frac{\partial Y}{\partial \lambda_i} + \frac{\partial \Delta\Pi}{\partial \lambda_i} \quad (16)$$

Equation 16 states that a portfolio can be viewed as a linear combination of positions in the underlying λ; the coefficients of these positions being the deltas. For i=2 . . . l+1, the positive/negative/zero deltas indicate whether the portfolio is long/short/neutral with respect to congestion in each flowgate. For flowgates in which congestion could occur in either direction, interpretation of the corresponding deltas should be performed with care. For example, in linear portfolios, the delta with respect to flowgate congestion in one direction is the negative of the delta with respect to flowgate congestion in the opposite direction. $\delta_1(t)$ represents the delta with respect to the reference node price at time t.

The use of the described deltas is similar, in some aspects, to the use of deltas in equity markets. However, equity markets utilize deltas defined with respect to present parameters such as an option with respect to current stock prices. The methods and techniques of the present invention use deltas defined with respect to future prices λ(T).

Arbitrage

If a strategy, Γ, has a net trading gain ΔΠ(Γ) that is greater than or equal to zero, then an arbitrage exists in the m trade derivative instruments. The vector λ(t) over the interval [0, T] can have a number of values (denoted Λ). Thus in equation form, the above statement says that arbitrage exists if there is a trading strategy Γ such that:

$$\Delta\Pi(\Gamma) \geq 0 \forall \lambda(t) \ni \Lambda(t) \quad (17)$$

with the inequality being strict for at least one realization of λ(t).

One consideration in developing the trading strategy to hedge various derivative contracts is the ability to predict the correct flowgate congestion set Ψ. In general, there is always the risk of not predicting Ψ correctly. Accordingly, a market participant should, in practice, adjust the fair value of a derivative contract by an appropriate premium which takes into account an incorrect prediction for Ψ.

NUMERICAL EXAMPLES

To illustrate and clarify the usefulness and benefits of the present invention techniques and methods a number of numerical examples are provided herein. These examples are merely illustrative in nature and are not intended to limit the scope of the present invention nor the coverage provided by the claims appended hereto. In all the examples, the network 500 of FIG. 5A is assumed as having zero transmission losses.

Figures 5A, 5B:
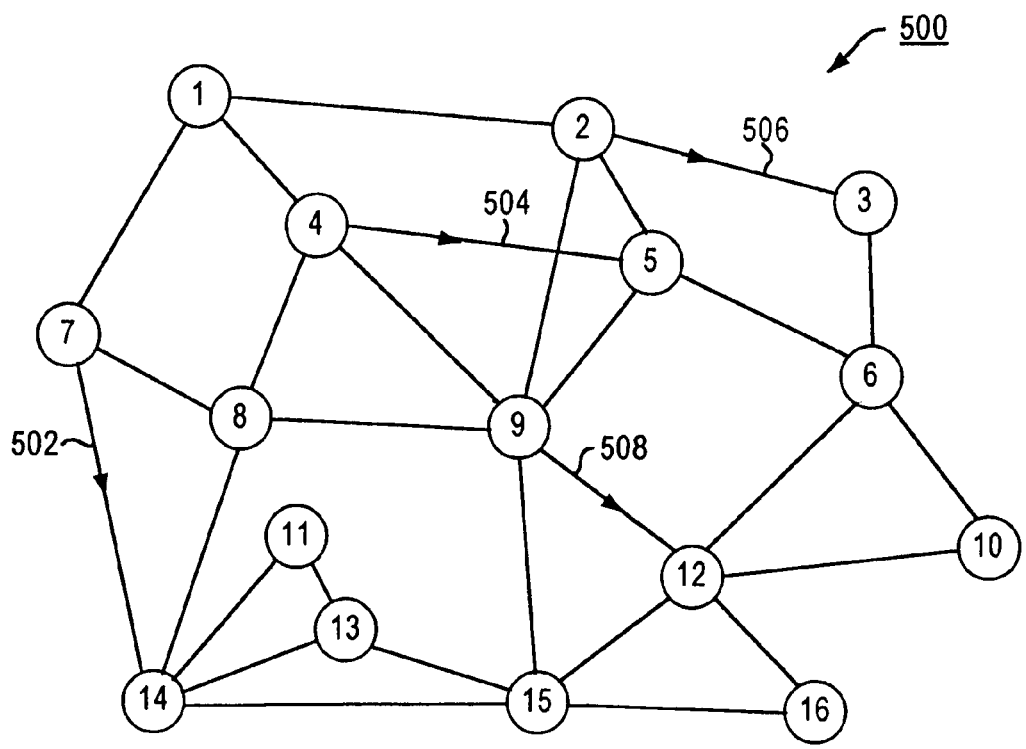
FIGS. 5A and 5B illustrate an exemplary transmission network and accompanying PTDFs, respectively.

FIG. 5A illustrates that the set of potentially congested flowgates include node 7 to node 14 (502), node 4 to node 5 (504), node 2 to node 3 (506) and node 9 to node 12 (508). Exemplary PTDF's for these flowgates are provided by the table of FIG. 5B. Thus, from this table and the assumption about zero losses, the A matrix for the interval [0, T] is:

$$A = \begin{bmatrix} 1 & 0 & 0 & 0 & 0 \\ 1 & 0.25 & 0.48 & -0.29 & 0.17 \\ 1 & 0.29 & 0.52 & 0.71 & 0.39 \\ 1 & 0.19 & -0.20 & 0.05 & -0.08 \\ 1 & 0.30 & 0.80 & 0.07 & 0.21 \\ 1 & 0.32 & 0.54 & 0.37 & 0.51 \\ 1 & -0.20 & 0.03 & 0.04 & 0.02 \\ 1 & 0.17 & -0.08 & 0.05 & -0.08 \\ 1 & 0.30 & 0.22 & 0.06 & -0.19 \\ 1 & 0.33 & 0.50 & 0.30 & 0.61 \\ 1 & 0.60 & 0.16 & 0.06 & 0.03 \\ 1 & 0.36 & 0.41 & 0.15 & 0.81 \\ 1 & 0.62 & 0.17 & 0.07 & 0.10 \\ 1 & 0.80 & 0.10 & 0.06 & 0.08 \\ 1 & 0.50 & 0.24 & 0.09 & 0.25 \\ 1 & 0.43 & 0.33 & 0.12 & 0.53 \end{bmatrix}$$

In this example, three liquid futures contracts are assumed

| Contract | Price |
|---|---|
| a) Locational contract at node 1 | 18.00 |
| b) TCC from node 1 to 16 | 25.78 |
| c) TCC from node 2 to 12 | 21.05 |

From this information, the portfolio matrix P can be constructed (all matrix entries are zero unless otherwise noted)

$$P = \begin{array}{c} \\ 1 \\ 2 \\ 3 \\ 4 \\ 5 \\ 6 \\ 7 \\ 8 \\ 9 \\ 10 \\ 11 \\ 12 \\ 13 \\ 14 \\ 15 \\ 16 \end{array} \begin{bmatrix} a & b & c \\ +1 & -1 & \\ & & -1 \\ & & \\ & & \\ & & \\ & & \\ & & \\ & & \\ & & \\ & & \\ & +1 & \\ & & \\ & & \\ & & \\ & & +1 \end{bmatrix}$$

While the actual values of the traded instruments and of the congestion pattern are not needed to perform the analysis, the examples included herein assume that congestion events for any hour are independent and the congestion parameters have the characteristics:

$$\lambda_1 = 10 \quad (18a)$$

$$\lambda_i = \begin{cases} 0 & \text{with probability } .9 \\ 20 & \text{with probability } .09 \quad \text{for } i > 1 \\ 800 & \text{with probability } 0.01 \end{cases} \quad (18b)$$

Valuation of Linear Derivative Contract

Figure 7:
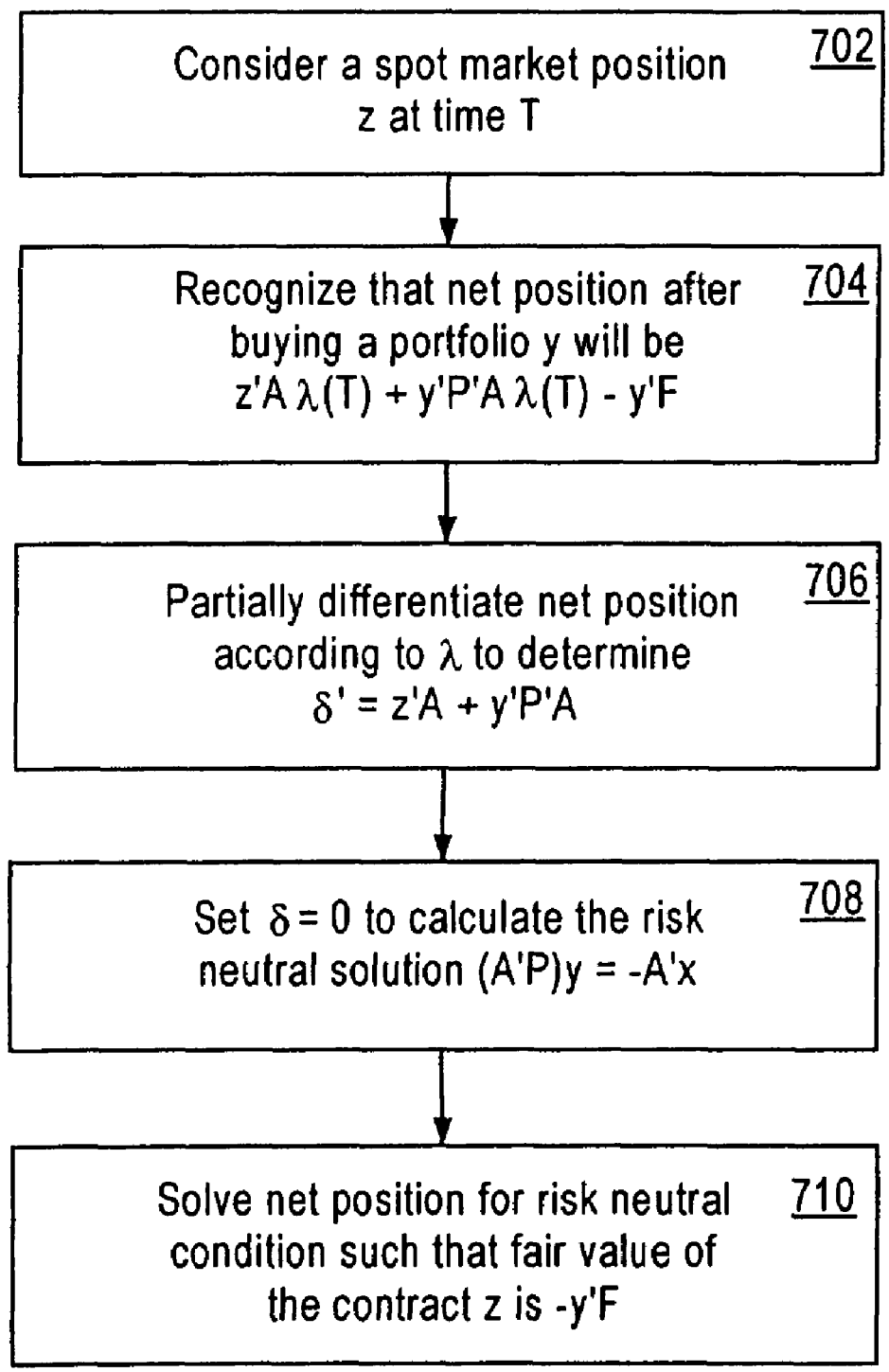
FIG. 7 depicts a flowchart for implementing an exemplary method for calculating a fair value for future spot market position.
Figure 8:
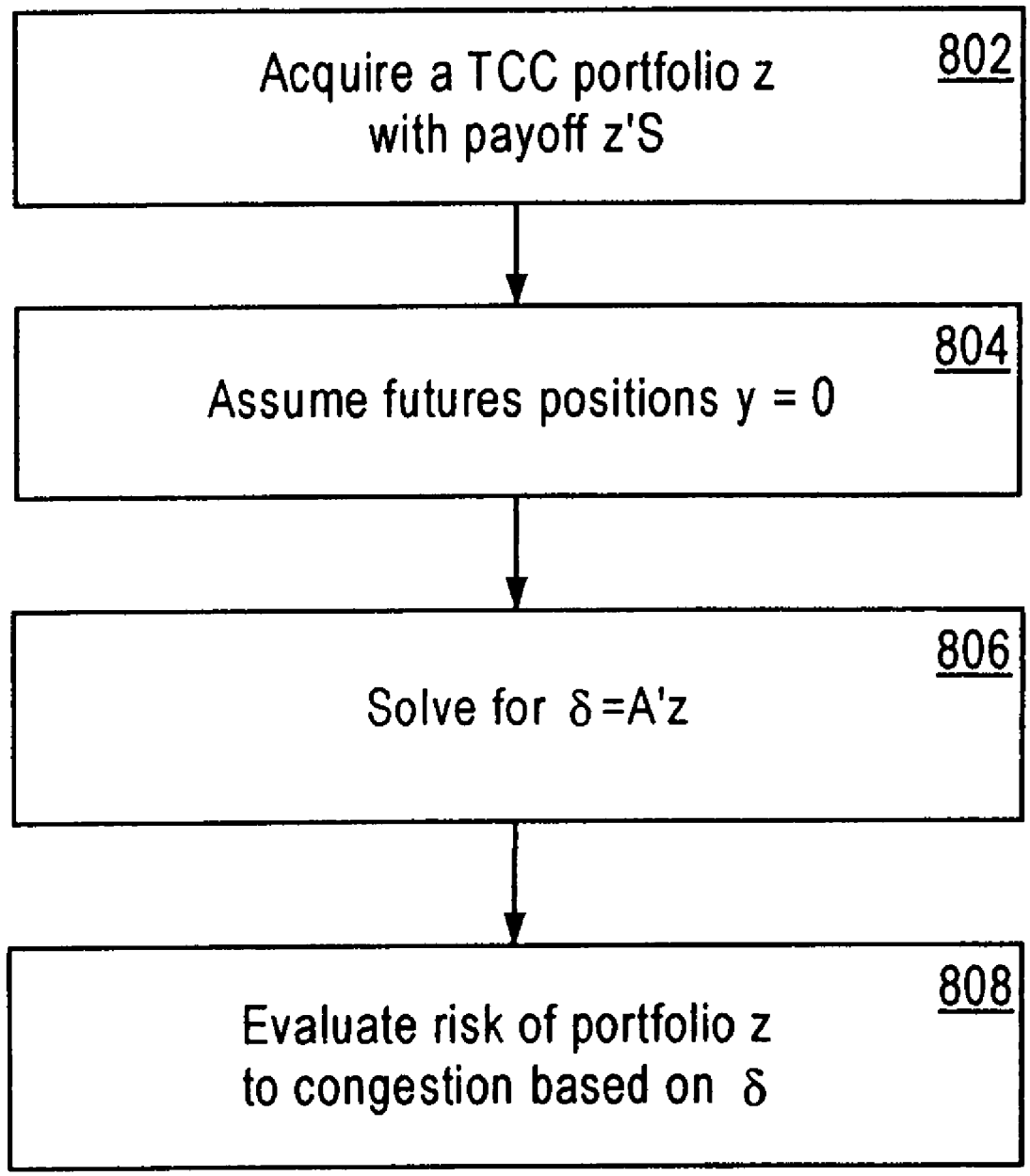
FIG. 8 depicts a flowchart for implementing an exemplary method of evaluating the congestion risk of a portfolio of TCCs.

As stated earlier, linear contracts are those whose payoffs depend linearly on the underlying spot prices, or in other words, on the underlying shadow, or future, prices $\lambda$. FIG. 7 provides a flowchart for determining a fair market value for such contracts.

One of the simplest linear contracts to consider in step 702 is a spot market position z at time T. The vector z has a dimension n, equal to the number of network nodes, (e.g. n=16) such that its $k^{th}$ entry, $z_k$, represents a spot market position held at location k. In the sequel, a negative number means a short position, while a positive number means a long position. Aspects of the present invention allow a market participant to determine, at time 0, the fair market value of the spot market position z.

A futures market position vector y has dimension m, equal to the number of traded instruments, (e.g. 3) such that the $k^{th}$ entry $y_k$ represents a futures market position in the traded futures contract k.

If the market participant takes a position y in the futures market at time 0 and closes it out at time T, then the trading gain over the interval [0, T] is the ending value (y'P'A$\lambda$(T)) minus the starting value (y'F). In other words, $$\Delta \Pi = y'P'A\lambda(t) - y'F \quad (19)$$

The net position, as indicated in step 704, of the market participant is the sum of the payoff, Y, from the spot market position z and the trading gains from the futures market $$\text{Net Position} = z'A\lambda(T) + \Delta\pi \quad (20)$$

This net position can be re-written as $$\text{Net Position} = z'A\lambda(T) + y'P'A\lambda(T) - y'F \quad (21)$$

and has exposure to congestion risk through the terms that depend on $\lambda$(T).

Applying equation (16) to equation (21) (i.e., taking the partial derivatives in step 706 with respect to $\lambda_i$) results in:

$$\delta' = z'A + y'P'A \quad (22)$$

The risk neutral value is determined in step 708 by setting the deltas of the net position to zero:

$$\delta' = 0 \quad (23)$$

Combining equations (22) and (23) results in $$(A'P)y = -A'z \quad (24)$$

If equation (24) is satisfied then equation (15) (i.e., fair value=Y+$\Delta\Pi(\Gamma)$) simplifies in step 710 to $$\text{fair value} = -y'F \quad (25)$$

Also, the market participant realizes that arbitrage exists when the fair value is positive (i.e., when y'F<0) and z=0.

Often equation (24) results in a set of equations with more equations than unknowns (i.e. overdetermined). This generally occurs when the numbers of traded futures contracts available is less than the number of underlying shadow prices $\lambda$.

When the system of equations (24) does not have a solution, a risk neutral fair value for z is not possible. Under these circumstances, equation (24) must be relaxed in some manner. Several alternatives are expressly contemplated such as:

1. A market participant, using outside information, ignores congestion at less important, or less significant, flowgates; and
2. Equation (24) is solved in a weighted least squares sense by assigning different weights to different flowgate congestion events.

As a result of equation (24) and its preceding steps, a market participant can determine the precise fair value of a linear derivative locational contract without reference to any underlying random process, and recognize arbitrage opportunities.

Specific Example 1

Analyzing Risk

For this example, assume the market participant holds, as indicated in step 802, a pure TCC portfolio (i.e., the net energy position is 0) wherein they are short 2 MWh at node 1, short 4 MWh at node 4, short 1 MWh at node 12, long 5 MWh at node 7, and long 2 MWh at node 14. This is the same as holding 2 MW of 1→14 TCC, 1 MW of 1→7 TCC and 4 MW of 4→7 TCC. The participant's position gives:

$$z' = [-2\ 0\ 0\ -4\ 0\ 0\ 5\ 0\ 0\ 0\ 0\ -1\ 0\ 2\ 0\ 0] \quad (26)$$

In this TCC portfolio, the markets participant's payoff over the interval [0, T] is at time T and is calculated according to:

$$Y = z'S \text{ (or } Y = z'A'\lambda\text{)} \quad (27)$$

For this example, which merely analyzes the risk involved in the participant's position, it is assumed in step 804 that the market participant does not wish to use any traded futures to manage risk (i.e., y=0). In this case $\Delta\Pi=0$ and the y term from equation (22) vanishes.

Accordingly, δ is calculated in step 806 using:

$$\delta = A'z = \begin{vmatrix} 0 \\ -0.52 \\ 0.74 \\ -0.03 \\ -0.23 \end{vmatrix} \quad (28)$$

Analysis, as performed in step 808, of the results (i.e. equation 28) allows the market participant to realize their position z is neutral to price change at the reference node ($\delta_1=0$), long with respect to congestion to flowgate 504 ($\delta_3>0$) and short with respect to congestion in flowgate 502, 506 and 508 ($\delta_1$, $\delta_4$ and $\delta_5<0$). As a result, when flowgate 502 congests (corresponding to a shadow price $\lambda_2>0$), the market participant loses 0.52 dollars for every dollar of maximum price differential across the distribution system 500. When flowgate 504 congests (corresponding to the shadow price $\lambda_3>0$), the market participant gains 0.74 dollars for every dollar of maximum price differential across the system 500.

In contrast, if the market participant's spot price position at time T had been a different portfolio of TCC, for example:

$$z' = [8 \; -1 \; 0 \; -3 \; 0 \; 0 \; -4 \; 0 \; 0 \; 0 \; 0 \; 0 \; 0 \; 0 \; 0] \quad (29)$$

then $$\delta = A'z = \begin{vmatrix} 0 \\ -0.02 \\ 0 \\ -0.02 \\ -0.01 \end{vmatrix} \quad (30)$$

This solution for δ shows that it is possible to be completely insulated from congestion risk (i.e., $\delta_3=0$) at flowgate 504 (from node 4 to 5) by selecting an appropriate position z. Other zero-risk portfolios for flowgate 504 also exist.

For example, another portfolio of TCCs $$z' = [-2 \; 10 \; 0 \; 0 \; 0 \; 0 \; 4 \; 0 \; 0 \; 0 \; 0 \; -12 \; 0 \; 0 \; 0] \quad (31)$$

provides $$\delta = A'z = \begin{vmatrix} 0 \\ -2.62 \\ 0 \\ -4.54 \\ -7.94 \end{vmatrix} \quad (32)$$

The risk against congestion in flowgate 504 is again zero; however, the other risks (i.e. negative δ values) are greater in equation (32) than in equation (30). Therefore, aspects of the present invention can be used to identify portfolios of TCCs to reduce and/or eliminate risk due to congestion at one or more flowgates.

Specific Example 2

Hedging

In the previous examples, no futures position were taken to offset the risk. In this example, assume the market participant is short 1 MWh of a TCC contract from node 1 to node 10 which gives:

$$z' = [1 \; 0 \; 0 \; 0 \; 0 \; 0 \; 0 \; 0 \; -1 \; 0 \; 0 \; 0 \; 0 \; 0 \; 0] \quad (33)$$

As a result, $$\delta = A'z = \begin{vmatrix} 0 \\ -0.33 \\ -0.50 \\ -0.30 \\ -0.61 \end{vmatrix} \quad (34)$$

If congestion only occurs at only flowgate 7→14 502, then the participant's position would be short 0.33 (i.e. the participant would lose 0.33 times the maximum system price differential at this time).

The total cost to the market participant of congestion at time T can be calculated as $$\text{Cost of congestion} = [A\lambda(t)]'z = \delta\lambda(T) \quad (35)$$

Figure 9:
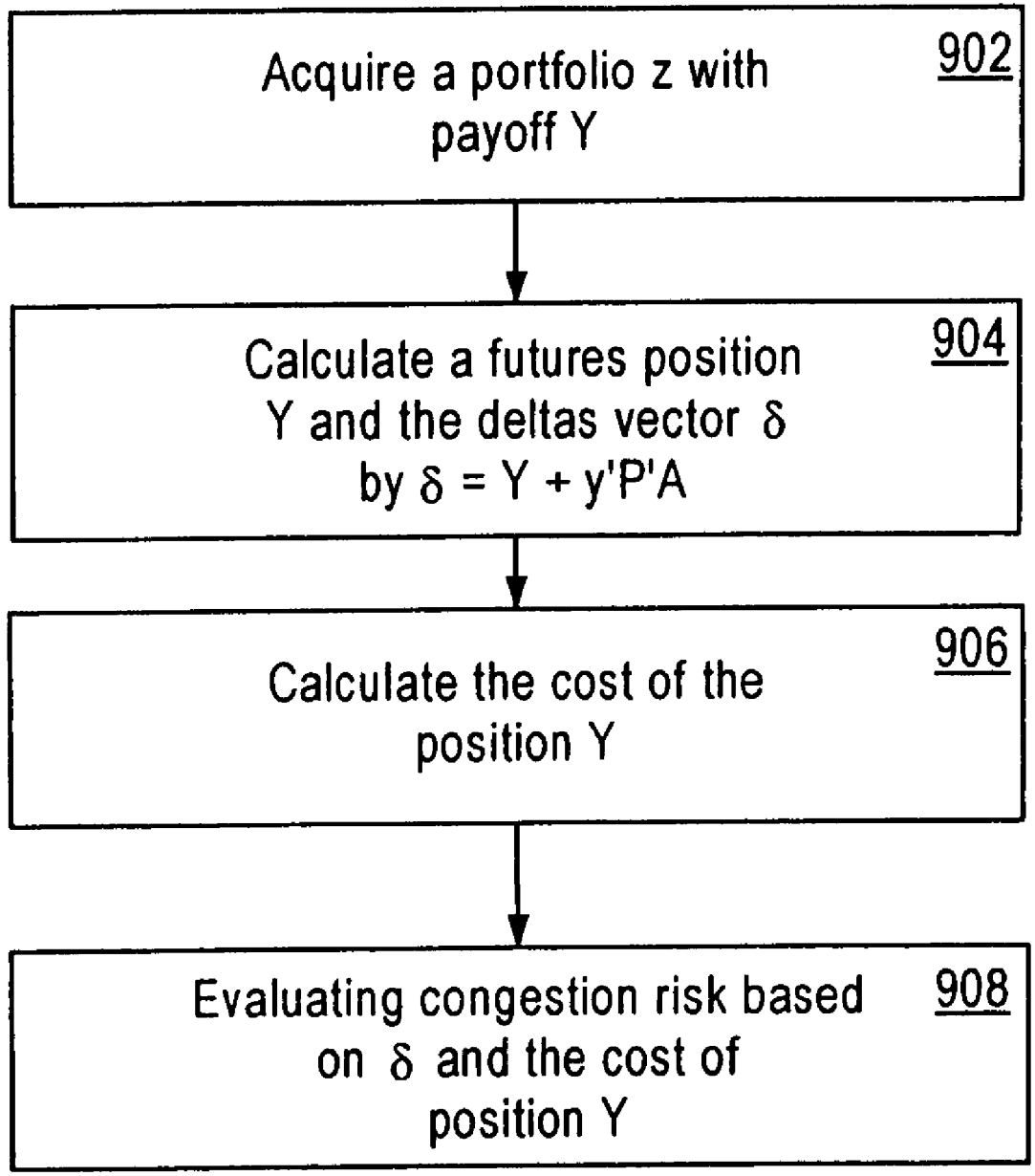
FIG. 9 depicts a flowchart for implementing an exemplary method for determining a hedging strategy.

FIG. 9 depicts a flowchart illustrating how this cost, or risk, of the portfolio z acquired in step 902 can be removed or reduced by purchasing an appropriate portfolio y in the traded 3 instruments of the futures market.

Aspects of the present invention permit the participant to evaluate different trading strategies in the 3 tradable instruments to reduce the overall risk. In particular, the participant is interested in taking a position y at time 0 and closing it out at time T.

Referring back to equation (24), provides $$(A'P)y = \begin{bmatrix} 1.0 & 0 & 0 \\ 0 & 0.43 & 0.11 \\ 0 & 0.33 & -0.07 \\ 0 & 0.12 & 0.44 \\ 0 & 0.53 & 0.64 \end{bmatrix} \begin{bmatrix} y_1 \\ y_2 \\ y_3 \end{bmatrix} = \begin{bmatrix} 0 \\ 0.33 \\ 0.50 \\ 0.30 \\ 0.61 \end{bmatrix} \quad (36)$$

The system of equations (36) which is solved in step 904 is overdetermined (5 equations, 3 unknowns) and it is, therefore, necessary to relax some conditions. One possibility, as mentioned earlier, is to solve equation (36) in the least squares sense. Another possibility is to set the deltas in only certain flow gates (as opposed to all flowgates) equal to zero. As a result, a subset of equations (36) is solved. Under this second alternative, however, the market participant accepts the risk for congestion event at the flowgates corresponding to those deltas not set to zero.

Five exemplary strategies are considered as shown in the following table:

| Strategy | Description |
|---|---|
| 1 | No hedging |
| 2 | solve equation (36) using least squares |
| 3 | $\delta_i = 0$ for i = 1, 2, 3 |
| 4 | $\delta_i = 0$ for i = 1, 3, 4 |
| 5 | $\delta_i = 0$ for i = 1, 3, 5 |

Strategy 1 is already illustrated in equation (34) in which $\delta' = [0 \; -0.33 \; -0.5 \; -0.3 \; -0.61]$ and the cost of hedging $(y'F) = 0$ (i.e., no hedging).

Strategy 2 results in $\delta' = [0 \; 0.12 \; -0.18 \; -0.11 \; -0.03]$ and the cost of hedging $(y'F) = 29.60$ Strategy 3 results in $\delta' = [0\ 0\ 0\ -0.87\ -1.02]$ and the cost of hedging ($y'F$) =3.42.

Strategy 4 results in $\delta' = [0\ 0.37\ 0\ 0\ 0.39]$ and the cost of hedging ($y'F$) =45.99.

Strategy 5 results in $\delta' = [0\ 0.27\ 0\ -0.24\ 0]$ and the cost of hedging ($y'F$) =32.27.

The position y to take in the different instruments, as calculated in step 904, to implement the various trading strategies are given by each of the columns of the following table:

| Contract | Strategy | | | | |
|---|---|---|---|---|---|
| | 1 | 2 | 3 | 4 | 5 |
| a | 0 | 0 | 0 | 0 | 0 |
| b | 0 | 1.02 | 1.19 | 1.58 | 1.47 |
| c | 0 | 0.16 | −1.62 | 0.25 | 0.27 |

Strategy 3 involves solving $z'A_{red} + y'P'A_{red} = 0$ for the position y; where $A_{red}$ is the matrix formed from the first three columns of A. These three columns correspond to $\delta_1$, $\delta_2$ and $\delta_3$. Strategy 4 and strategy 5 are similar except $A_{red}$ includes only columns 1, 3 and 4 for strategy 4 and includes only columns 1, 3 and 5 for strategy 5. Solving for y according to the above strategies is preferably accomplished using conventional mathematical software for analyzing systems of equations.

Interpreting the results, in step 908, of the different strategies indicates that in strategy 1, the participant is short on all the potentially congested flowgates and, therefore, at risk. In strategy 4, however, the short positions ($\delta_i < 0$) are removed and, thus, all exposure to congestion is removed. This coverage comes at a cost, however (i.e., $45.99) which is calculated in step 906. In strategy 5, if flowgate 502 were to congest, then a profit is possible (i.e., $\delta_2 > 0$) but $\delta_4$ indicates a risk of a short position with respect to flowgate 506. Thus, there are different ways of hedging specific congestion risk, each of which yields different outcomes.

Extreme Risk

A quantity known as the extreme value risk is considered to be the maximum portfolio loss that can occur with a probability of 0.5% or higher. When one of the flowgates congest with a value of $800/MWh and no other flowgates congest, such a probability is satisfied. Using the equations (18a and 18b), the market participant's short position without hedging (i.e., strategy 1) has an extreme value risk of $488. Because $\delta_5$ (flowgate (9→12)) is the largest in magnitude it provides the largest extreme value risk of (0.61)×(800)=$488 loss. The following table shows the extreme risk values corresponding to the different strategies.

| | Strategy | | | | |
|---|---|---|---|---|---|
| | 1 | 2 | 3 | 4 | 5 |
| Extreme Risk | $488 | $144 | $816 | $0 | $192 |

These values may also be used by the market participant when selecting a strategy from among the different alternatives for hedging specific congestion risks.

Valuation of Nonlinear Derivative Contracts

One typical example of a nonlinear derivative contract is an option and one common option is an European option on TCC contracts with a strike price of zero.

European TCC Options With a Strike Price of Zero

If the market participant sells a (non-traded) European option with a zero strike price on a TCC from node i to node j (in network 500) that expires at time T, then the payoff at time T is:

$$Y = -\max[0, z'A\lambda(T)] \quad (37)$$

where $z_i = -1$ and $z_j = +1$ and all other z are zero.

Since the payoff is always non-positive, the participant faces risks and would like to explore different trading strategies in the futures markets to hedge the risk. As seen before, the market participant wants to make $\delta_i$ of the net position equal to (or as close to) zero if possible. If this is possible, then the participant will have found a risk-free hedge against the TCC call option and also have determined a fair market value for the TCC call option.

If the market participant takes a position y in the futures market at time 0 and closes it at time T, then the trading gain over the interval [0,T] is:

$$\Delta\Pi = y'P'A\lambda(t) - y'F \quad (38)$$

Therefore, the net position at time T is $$\text{Net Position} = -\max[0, z'A\lambda(T)] + \Delta\Pi \quad (39a)$$

or, expanding $\Delta\Pi$:

$$\text{Net Position} = y'P'A\lambda(t) - y'F - \max[0, z'A\lambda(T)] \quad (39b)$$

Defining a quantity $$w = A'z \quad (40)$$

and combining equations (38) and (39b) provides an equation for the delta vector (i.e., the partial derivative with respect to $\lambda_i$) of this position:

$$\delta = \begin{cases} y'P'A - w' & \text{if } w'\lambda > 0 \\ y'P'A & \text{if } w'\lambda \leq 0. \end{cases} \quad (41)$$

If the further assumption is made that only one flowgate can be congested at time T (i.e., only one value of $\lambda_i > 0$ at any one time), then equation (41) collapses into a single equation, as described below.

With $\lambda(T) \geq 0$, the condition $w'\lambda > 0$ being satisfied is equivalent to the condition that $\lambda_i(T) = 0$ whenever $w_i \leq 0$. Similarly, the condition that $w'\lambda \leq 0$ is satisfied is equivalent to the condition that $\lambda_i(T) = 0$ whenever $w_i > 0$. Also, for a TCC, the net energy position at the reference node is zero (i.e., $w_1 = 0$).

Therefore, by defining $$v_i = \max[w_i, 0] \quad (42)$$

equation (41) can be written as:

$$\delta = -v' + y'P'A \quad (43)$$

and, thus, the riskless hedge condition is obtained by setting $\delta = 0$ so that $$A'Py = v \quad (44)$$

Which also indicates that the fair value of the short position in the European TCC option is:

$$\text{fair value} = -y'F \quad (45)$$

Equation (44) can be interpreted as revealing that to completely hedge the TCC call option, the futures trading strategy should a) stay delta neutral to those congestion events that make the option an out-of-money one but to b) have positive deltas (equal to the negative of the short position) to those congestion events which make the option in-the-money.

Equations (43) and (41) are different only if two or more constraints (i.e., congestion) occur for which corresponding entries of w have different signs. In multiple flowgate congestion cases in which the corresponding entries of w have the same signs, then equation (41) still holds. However, when such an situation occurs in which the entries of w have different signs, then equation (43) gives an upper bound for the actual deltas. Likewise, equation (45) gives an upper bound on the actual fair value. This can be seen because the non-positive payoffs of the short option is $-\max[0, w'\lambda(T)]$. If a forward market position y is taken which satisfies equation (44), then the payoffs from the hedge equal $v'\lambda(T)-y'F$. Since $\lambda(T) \geq 0$ and $v' \geq w'$ and $v' \geq 0$, the result is that $v'\lambda(T) \geq \max[0, w'\lambda(T)]$. That is, the fair value for the short position is at least $-y'F$, and the option deltas are at most v.

Restating the above, taking a position y that satisfies equation (44) in the forward market perfectly hedges the TCC call option position when at most a single flowgate is congested at time T and either perfectly hedges, or over hedges, the call option position when multiple flowgates are congested at time T. A test for arbitrage is to check whether $y'F<0$. If this condition is met, arbitrage can then be realized by selling the TCC call option for at least zero price, while hedging (or over-hedging) this position at a negative price.

The above equations are applicable to any pure TCC portfolio whose net energy position is zero. Therefore, if z is represented by an arbitrary linear combination of a set of arbitrary TCCs, equation (44) can be used to determine the positions y to take in the forward market to hedge the one-sided TCC portfolio z, and its fair market value would be determined by equation (45).

European Options with a Non-Zero Strike Price

In the more general case where a market participant sells a European option with a strike price of X, maturing at time T, the market participant's payoffs from this contract at time T are given by $$Y = -\max[0, z'A\lambda(T)-X] \quad (46)$$

Defining $w=A'z$, as before, and assuming the same futures trading strategy provide an equation for the delta vector of this position:

$$\delta = \begin{cases} y'P'A - w' & \text{if } w'\lambda > X \\ y'P'A & \text{if } w'\lambda \leq X. \end{cases} \quad (47)$$

In general, for $X>0$, it is possible to either set the deltas corresponding to the upper half of equation (47) to 0 or to set the deltas corresponding to the bottom half of equation (47) to zero, but not both. Therefore, the market participant must make tradeoffs when selecting a hedging strategy.

One possible tradeoff includes selecting a trading portfolio that strictly bounds the payoffs of the European call option. In making this tradeoff, z is re-arranged into the sum of two sub-vectors, $\tilde{z}, \bar{z}$:

$$\tilde{z}_1 = \sum_i^n z_i, \tilde{z} = 0, \forall i > 1$$

$$\bar{z} = z - \tilde{z}$$

The two vectors are, intuitively, $\tilde{z}$, a pure energy position at the reference node (and zero values at all other nodes) and, $\bar{z}$, a portfolio of pure TCC positions (the sum of all the positions equal 0).

With these definitions of the sub vectors, equation (46) can be rewritten such that $$Y = -\max[0, z'A\lambda(T)-X] = -\max[0, (\tilde{z}'A\lambda(T)-X) + \bar{z}'A\lambda(T)] \quad (48)$$

Rearranging the terms of equation (48) provides a form of the equation which intuitively shows that the payoffs (which are non-positive) for the short option position in equation (48) is bounded above and below by:

$$-\max[0, (\tilde{z}'A\lambda(T)-X)] - \max[0, \bar{z}'A\lambda(T)] \leq Y \leq -z'A\lambda(T)+X \quad (49)$$

The first term on the left-hand side (i.e., $-\max[0, (\tilde{z}'A\lambda(T)-X)]$) is the European call option value on the pure energy position, $\tilde{z}_1$, at the reference node with a strike price X expiring at time T. This term, referred to later as c(X), can be found using the traditional options valuation methods as conventionally understood.

The second term on the left-hand side (i.e., $-\max[0, \bar{z}'A\lambda(T)]$) is the value of the option on a portfolio, $\bar{z}$, of TCCs with strike price 0. Defining for $\bar{z}$ (as was done in the previous specific example for z), $w = A'\bar{z}$ and $v_i = \max[w_i, 0]$ then, because $v'\lambda(T) \geq \max[0, \bar{z}'A\lambda(T)]$ equation (49) can be rewritten as:

$$-c(X) - v'\lambda(T) \leq Y \leq -z'A\lambda(T)+X \quad (50)$$

Using equations (44) and (45) developed earlier, two different futures portfolios, $\tilde{y}$ and $\bar{y}$ can be solved for in evaluating equation (50).

First, where $A'P\bar{y}=v$, then $-\bar{y}'F$ is the fair value of $v'\lambda(T)$. Secondly, where $A'P\tilde{y}=A'z$, then $-\tilde{y}'F$ is the fair value of position z. Thirdly, the payoff Y is always non-positive. As a result, equation (50) can be re-written to reflect:

$$-c(X) - \bar{y}'F \leq \text{fair value of } Y \leq \min[X - \tilde{y}'F, 0] \quad (51)$$

Based on equation (51), the market participant can hedge (actually, over-hedge) by purchasing a European call option (i.e., $\tilde{y}$) at the reference node with strike price X and by creating a long position in a synthetic one-sided TCC portfolio (defined by $\bar{z}$). The net position of the market participant is then a position with non-negative payoffs.

Applicability to Asian and American Options

The methods and techniques discussed above with respect to European options can be extended, with appropriate modification, to apply to both American and Asian options. In an American option, the market participant is permitted to exercise the option anywhere in the interval [0, T]. In Asian options, the payoff is $\max[0, z'A\hat{\lambda}-X]$ where $\hat{\lambda}$ is the average $\lambda$ over the time interval [0,T].

Specific Example 1

European TCC Option with a Strike Price of 0

For this example, assume the option position is given by:

$$z' = [-1\ 0\ 0\ 0\ 0\ 0\ 0\ +1\ 0\ 0\ 0\ 0\ 0\ 0] \quad (52)$$

Assuming risk neutrality, as before, results in the system of equations $$(A'P)y = \begin{bmatrix} 1.0 & 0 & 0 \\ 0 & 0.43 & 0.11 \\ 0 & 0.33 & -0.07 \\ 0 & 0.12 & 0.44 \\ 0 & 0.53 & 0.64 \end{bmatrix} \begin{bmatrix} y_1 \\ y_2 \\ y_3 \end{bmatrix} = \begin{bmatrix} 0.00 \\ 0.30 \\ 0.22 \\ 0.06 \\ 0.00 \end{bmatrix} \qquad (53)$$

Applying equations (44) and (45), the system of equations (53) is overdetermined (5 equations, 3 unknowns) and it is, therefore, necessary to relax some conditions (as done in the previous examples. As before, solving for the deltas and the y positions is preferably performed using computerized tools designed for such complex calculations.

Five exemplary strategies are considered, for this example, as shown in the following table:

| Strategy | Description |
|---|---|
| 1 | No hedging |
| 2 | solve equation (53) using least squares |
| 3 | $\delta_i = 0$ for $i = 1, 2, 3, 4$ |
| 4 | $\delta_i = 0$ for $i = 1, 2, 4$ |
| 5 | $\delta_i = 0$ for $i = 1, 3, 4$ |

The results of these five strategies are different delta vectors that can be analyzed by the market participant. The different delta vectors are shown below (in columns) according to rows indexed by network node. The last row shows the hedging cost (y'F) for each strategy.

| | Trading Strategy | | | | |
|---|---|---|---|---|---|
| i | 1 | 2 | 3 | 4 | 5 |
| 1 | 0.00 | 0.00 | 0.00 | 0.00 | 0.00 |
| 2 | −0.30 | −0.09 | −0.01 | 0.00 | −0.03 |
| 3 | −0.22 | −0.01 | 0.01 | 0.02 | 0.00 |
| 4 | −0.06 | −0.13 | 0.00 | 0.00 | 0.00 |
| 5 | 0.00 | 0.10 | 0.34 | 0.35 | 0.32 |
| cost in ($) | 0.00 | 8.30 | 17.04 | 17.40 | 16.10 |

The position y (in the columns) to take in each contract (in the rows) in order to implement each strategy is shown by the following table:

| | Trading Strategy | | | | |
|---|---|---|---|---|---|
| Contract | 1 | 2 | 3 | 4 | 5 |
| a) | 0.00 | 0.00 | 0.00 | 0.00 | 0.00 |
| b) | 0.00 | 0.58 | 0.69 | 0.72 | 0.66 |
| c) | 0.00 | −0.32 | −0.04 | −0.06 | −0.04 |

Seller's Choice Contracts

A seller's choice contract is an instrument in which the buyer of electricity pays the seller of electricity a fixed price per MWh at time 0 in return for getting, at time T, electricity from the seller the lowest node spot price in the distribution system 500 at time T. Seller's choice contracts provide a useful tool for speculating on location prices. Using aspects of the present invention, it is possible to price, hedge and construct synthetic seller's choice contracts more accurately than previously possible.

The seller of the contract (not necessarily the underlying seller of the electricity) is exposed to the worst risk scenario of a price spike at all the nodes. However, the seller can over-hedge this risk by taking a long position in the futures market at any node. In particular, for example, by taking a long position at the reference node.

The buyer of the contract is also exposed to the risk of transmission congestion. In particular, the minimum price at a node could become very low (or even less than zero) due to congestion in a flowgate. Therefore, the buyer is considered to be "short" congestion in the flowgates.

As an example, assume the seller's choice contract is for 1 MWh and a buyer of the contract wants to explore different trading strategies in the futures markets to hedge exposure to the risk in the contract (due to congestion). This example could also be viewed from the perspective of the contract seller; according to this alternative perspective, the contract seller's strategy will be exactly opposite to that of the contract buyer's strategy.

As before, the market participant (e.g., the contract buyer) wants to take, at time 0, a position y in the futures market and close it at time T. The trading gain ($\Delta\Pi n$) over the interval [0, T] is $y'P'A\lambda(T) - y'F$. For a seller's choice contract at time T, the payoff is a minimum taken over all the nodes of the network 500:

$$Y = \min[A\lambda(T)] \qquad (54)$$

Thus, the net position of the market participant is:

$$\text{Net Position} = \min[A\lambda(T)] + y'P'A\lambda(T) - y'F \qquad (55)$$

Since $\lambda(T) \geq 0$, it is convenient to define a term $x_i$ where $x_i = \min(A^*_i)$ and where $A^*_i$ denotes the $i^{th}$ column of A. Making the assumption that at most a single flowgate exhibits congestion at time T, the function $\min[A\lambda(T)]$ can be re-written as:

$$\min[A\lambda(T)] = x'\lambda(T) \qquad (56)$$

As a result, the net position equation becomes:

$$\text{Net Position} = x'\lambda(T) + y'P'A\lambda(T) - y'F \qquad (57)$$

and, the deltas vector becomes:

$$\delta = x' + y'P'A \qquad (58)$$

which allows solving for $\delta = 0$ to find the riskless hedge:

$$A'Py = -x \qquad (59)$$

and the fair value of the seller's choice contract:

$$\text{fair value} = y'F \qquad (60)$$

The conclusion from equations (58) and (59) is that the buyer of the seller's choice contract can take a position y in the futures markets to hedge the risk of the contract. As shown, previously, if the assumption regarding only single flowgate congestion is relaxed to encompass multiple flowgate congestion, then the estimate for fair value in equation (60) is an upperbound and the delta hedging strategy y of equation (59) in the forward market actually over-hedges (from the perspective of the contract buyer) the seller's choice contract.

Specific Example 1

Seller's Choice Contract

For this specific example, assume that the seller's choice contract is for 1 MWh and that a buyer of the contract wants to explore different trading strategies in the futures markets to hedge the exposure to risk from the contract.

The hedge condition is given by equation (59) as A'Py=x. As before, 5 different strategies are analyzed; however, this time the strategies illustrate hedging and valuing a seller's choice contract (from the buyer's perspective).

| Strategy | Description |
|---|---|
| 1 | No hedging |
| 2 | solve equation (59) using least squares |
| 3 | $\delta_i = 0$ for i = 1, 2, 5 |
| 4 | $\delta_i = 0$ for i = 1, 4, 5 |
| 5 | $\delta_i = 0$ for i = 1, 2, 3, 4 |

The results of these five strategies are different delta vectors that can be analyzed by the market participant. The different delta vectors are shown below (in columns) according to rows indexed by network node. The last row shows the hedging cost (y'F) for each strategy.

| | Trading Strategy | | | | |
|---|---|---|---|---|---|
| i | 1 | 2 | 3 | 4 | 5 |
| 1 | 1.00 | 0.00 | 0.00 | 0.00 | 0.00 |
| 2 | −0.20 | −0.03 | 0.00 | −0.39 | 0.06 |
| 3 | −0.20 | −0.09 | −0.02 | −0.47 | −0.07 |
| 4 | −0.29 | −0.17 | −0.28 | 0.00 | −0.03 |
| 5 | −0.19 | 0.11 | 0.00 | 0.00 | 0.37 |
| cost in ($) | 0.00 | −5.03 | −7.61 | −17.41 | 4.48 |

The position y (in the columns) to take in each contract (in the rows) in order to implement each strategy is shown by the following table:

| | Trading Strategy | | | | |
|---|---|---|---|---|---|
| Contract | 1 | 2 | 3 | 4 | 5 |
| a) | 0.00 | 1.00 | 1.00 | 1.00 | 1.00 |
| b) | 0.00 | −0.37 | −0.51 | 0.66 | −0.49 |
| c) | 0.00 | −0.16 | 0.13 | −0.84 | −0.47 |

Even though the above specific examples use static hedging (i.e., the hedging strategy does not change with time), the above techniques and methods can be extended to dynamic hedging. However, dynamic hedging strategies become dependent on the type of inter-temporal stochastic model for the λ assumed by the market participant.

Bidding at TCC Auctions

Figure 10:
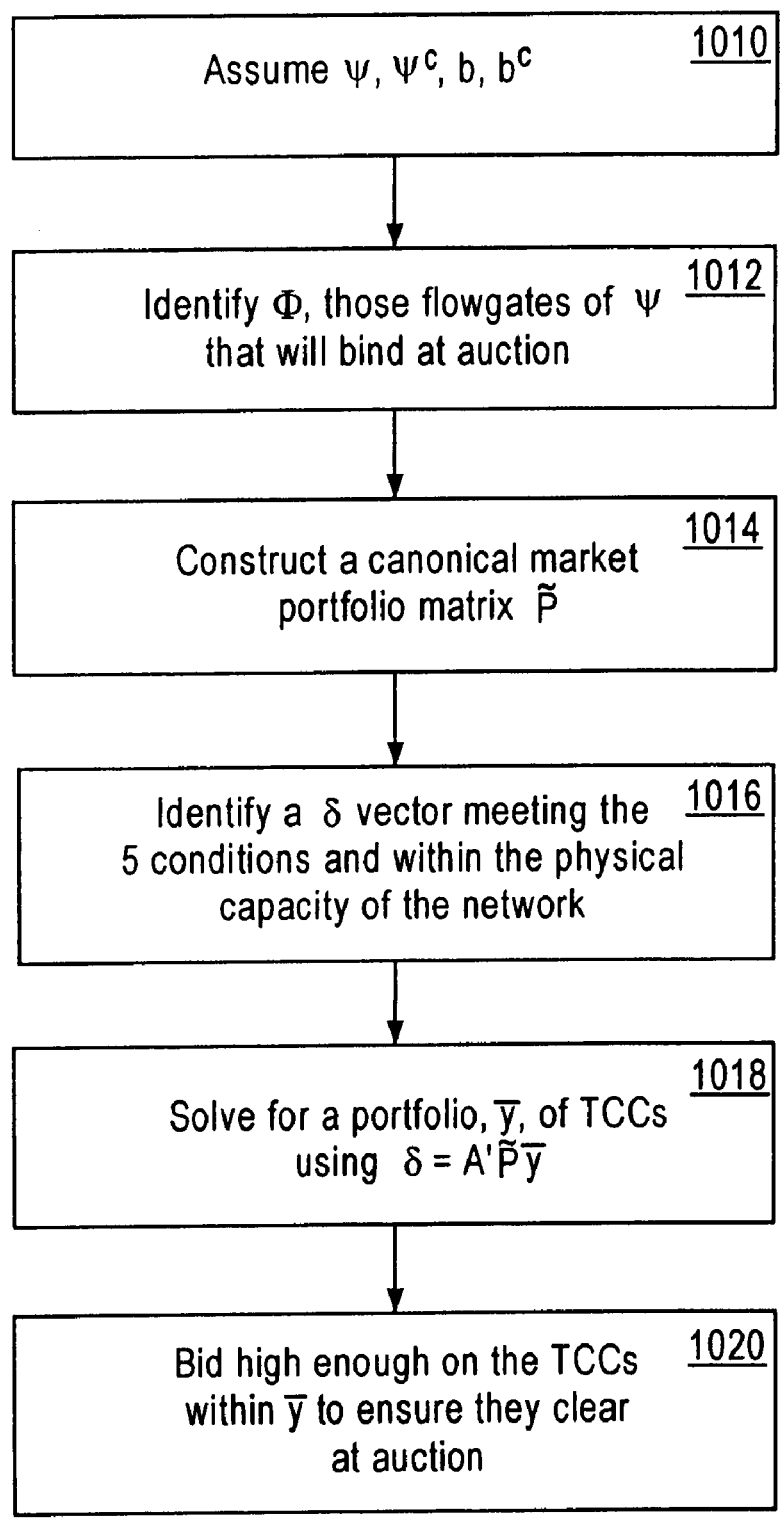
FIG. 10 depicts a flowchart for implementing an exemplary method for determining a bidding strategy at a TCC auction.

The previously described methods and techniques for valuing and hedging TCC options can be applied in developing a strategy for bidding at TCC auctions. In TCC auctions, TCCs are auctioned off by an Independent System Operator (ISO) for forward periods and, thus, represent forward contracts. Also, one-sided TCCs (or TCC options) with a zero strike price can also be sold by the ISO. FIG. 10 illustrates a flowchart for implementing an exemplary strategy according to embodiments of the present invention.

Preliminary to discussing the auction bidding strategy, additional definitions and quantities identified in step 1010 are useful as well as a discussion of the underlying dynamics of the auction.

Ψ represents the set of all flowgates (along with a direction) that can potentially congest in the time period for which the TCCs are auctioned off.

$\Psi^C$ represents the complement of Ψ and is the set of all the flowgates (including direction) not included in Ψ.

The PTDF sensitivity matrix corresponding to flowgates in the set Ψ is denoted A and $A^C$ denotes the sensitivity matrix corresponding to $\Psi^C$.

Any TCC can be expressed in step 1014 as a linear combination of canonical TCCs, where the $i^{th}$ canonical TCC is defined as a TCC from the reference node (node 1) to node i (for i=2, ..., n). Thus, there are n−1 canonical TCCs. The n−1 canonical TCCs are used to construct a canonical market portfolio matrix $\tilde{P}$ in which $\tilde{P}_{1,j}=-1$, $\tilde{P}_{j+1,j}=+1$ (for j=1, ..., n−1) and all other elements of $\tilde{P}$ are zero.

In an electricity distribution network, each flowgate has a physical limit to its capacity in each direction. The maximum available capacity associated with each flowgate in Ψ is denoted by a vector b (and $b^C$ for $\Psi^C$). Where $b_i$ is the maximum capacity available for flowgate i in Ψ.

A vector y is defined as a vector (of dimension (n−1) representing the aggregate market portfolio of canonical TCCs that are to get awarded in the auction.

A bid in a TCC auction includes both a quantity and a price. As recognized in the industry, the goal of the TCC auction, from the perspective of the ISO, is to maximize the given TCC bids of the market participants. However, this maximization is subject to the physical flowgate capacity restrictions of each flowgate. Thus, a TCC auction can be described mathematically as:

$$\max \Sigma (\text{TCC MW}) \times (\text{\$\$/MW TCC bids}) \qquad (61)$$

subject to the conditions that:

$$A'\tilde{P}y \leq b \qquad (62)$$

and $$(A^C)'\tilde{P}y \leq b^C \qquad (63)$$

If the maximum available capacity of a flowgate is taken up at auction, then the flowgate is said to "bind".

Equations 62 and 63 can be rewritten in terms of the earlier described deltas vector by referring to equation 22 which provides that:

$$\delta = A'\tilde{P}y \qquad (64)$$

and $$\delta^C = (A^C)'\tilde{P}y \qquad (65)$$

These last four equations provide, then, that $$\delta \leq b \qquad (66)$$

and $$\delta^C \leq b^C \qquad (67)$$

The resulting bidding strategy first recognizes that if the set of TCCs auctioned off to market participants maximizes available capacity at all flowgates in the set $\Psi$, then as many flowgates as possible in the set $\Psi$ must bind in the auction.

If a market participant can forecast in step 1012 which flowgates will bind at the auction (using a priori knowledge and observations), then a bidding strategy can be constructed. This set of forecasted flowgates is denoted hereafter as $\Phi$. Standard optimization principles reveal that the incremental capacity of each flowgate in $\Psi$ (with PTDFs that are linearly independent of the flowgate PTDFs in $\Phi$) but not in $\Phi$ will sell for zero price. Conversely, the incremental capacity (i.e., the deltas) on the flowgates in $\Phi$ will sell for non-negative prices.

When bidding on a portfolio of TCCs (as opposed to a single TCC), the participant is interested in optimizing the overall expected value even if this may require bidding a higher than expected value for some of the individual constraints.

Specifically, the above strategy is implemented by the market participant who attempts to construct an incremental portfolio, $\bar{y}$, of TCCs whose deltas have the following properties:

1. The incremental portfolio has non-negative deltas on those flowgates in $\Psi$ which do not bind in the auction. This results in the acquisition of valuable transmission rights at zero price.

2. The incremental portfolio has non-positive deltas with respect to congestion in flowgates in $\Psi^C$ that bind in the auction. This results in selling at a positive price the transmission rights to a flowgate that will never congest in the spot market.

3. The incremental portfolio has zero deltas with respect to congestion in those flowgates in $\Psi$ that bind in the auction. This results in not buying these rights at the auction.

4. The incremental portfolio does not have negative deltas with respect to congestion in any flowgate in $\Psi$. This results in the portfolio not being short congestion in any flowgate.

5. The incremental portfolio avoids binding any new flowgates that are not in the set $\Phi$. This ensures that the costs of acquiring the portfolio are non-positive.

Thus the market participant first finds in step 1016 the $\delta$ vector which satisfies equations 66 and 67 and also meets the above 5 conditions, and then solves in step 1018 for the portfolio $\bar{y}$ using $A'\tilde{P}\bar{y}=\delta$. Once the portfolio $\bar{y}$ is determined, then a profitable bidding strategy is to bid in step 1020 each of the TCCs within the portfolio at high enough money to get cleared at the auction and, by definition, the portfolio cost will be non-positive.

More generally, a market participant can implement a bidding strategy to create a TCC portfolio that has positive deltas with respect to those flowgates in $\Psi$ whose capacity rights are expected to sell cheaply in the auction, and has negative deltas with respect to those flowgates whose capacity rights are expected to sell at a premium in the auction. In practicing this strategy (in order to determine "cheaply" and "at a premium"), the market participant estimates expected values of the flowgate deltas using fair forward values of the deltas from forward price (and other derivative) information (if such forward prices exist) using the formulas derived earlier. Then TCCs for which a fair forward value is available would be bid (both buy and sell) into the auction at these forward values. If the market participant is long auction deltas that are underpriced relative to the forward market valuation, then arbitrage is possible by selling deltas (equal to the acquired auction deltas) in the forward markets. Similarly, if the market participant is short auction deltas that are over-priced relative to the forward market valuation, then arbitrage is possible by buying deltas (equal to the acquired auction deltas) in the forward markets.

If forward (and other derivative) markets do not exist or are illiquid, then in order to determine "cheaply" and "at a premium" (in implementing the strategy above), the market participant estimates expected value using knowledge, forecasts, and historical data about the transmission system, and by factoring in an appropriate risk premium to the expected value estimate.

Extension to TCC Options

The above-described strategy can be extended to auctions involving TCC options as well. For the case where it is assumed that only one flowgate is congested at time T, the incremental capacities (i.e., deltas) that the ISO has sold are given by:

$$\delta = \max[0, z'A] \quad (68a)$$

and $$\delta^C = \max[0, z'A^C] \quad (68b)$$

where the max function is taken over each element of the vector.

The resulting payoff from the ISO to the TCC holder at time T in the spot market equals $\delta'\lambda(T)$. As developed earlier, these deltas overestimate the true deltas if the condition of only one constraining flowgate is relaxed. Hence, from the perspective of the ISO, the single flowgate congestion represents the most restrictive case which the ISO must respect to remain risk neutral.

When flowgates in $\Psi$ are congested in the spot market, the ISO collects congestion rent equal to $b'\lambda(T)$. Thus, for p buy bids (each bid comprising a vector $z_p$ of positions in the options) the ISO ensures that:

$$\Sigma\delta_p'\lambda(T) \leq b'\lambda(T) \quad (69a)$$

or $$\Sigma\delta_p \leq b \quad (69b)$$

where the summations are performed over all p buy bids and $$\delta_p = \max[0, z_p'A] \quad (70)$$

Similarly, the ISO ensures that $$\Sigma\delta_p^C \leq b^C \quad (71)$$

In implementing the bidding strategy for TCC options, the market participant selects deltas satisfying conditions 1, 3 and 5 and then constructs a resulting portfolio $z_p$ using equation 70. These positions are then bid high enough to be cleared at auction.

When an auction includes both TCCs and TCC options, then the market participant can undertake both calculations simultaneously to construct a portfolio of both TCCs and options to bid on.

Multi-Settlement Nodal Markets

Figure 11:
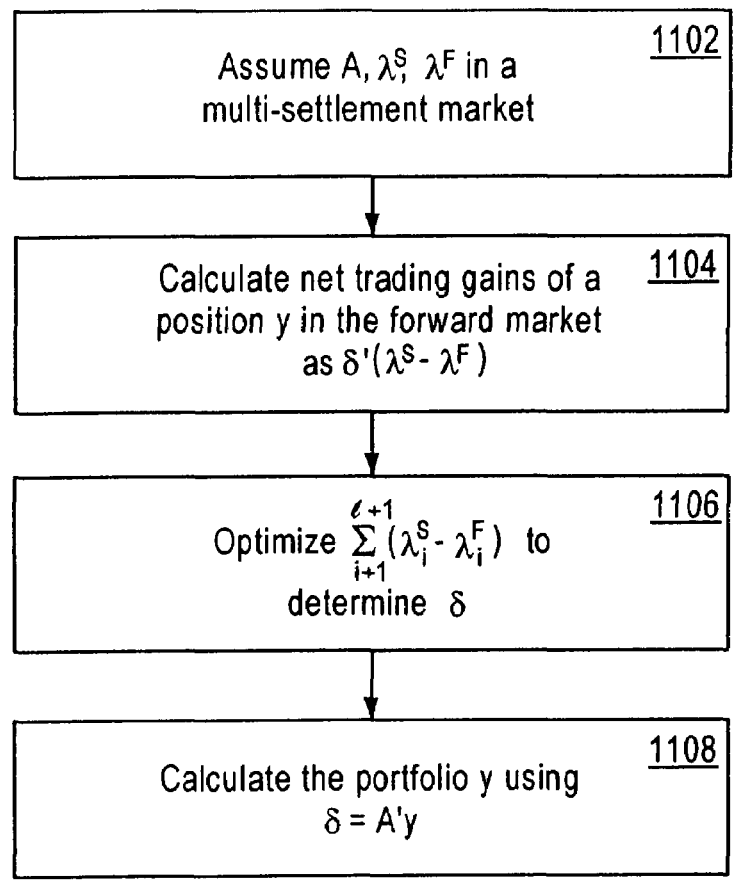
FIG. 11 depicts a flowchart for implementing an exemplary method for analyzing risk in a multi-settlement market.

In a multi-settlement market, market participants can take financial positions at different nodes on a forward basis with such transactions being settled against real-time spot prices. The market participant, to maximize profit, is interested in determining what strategy for taking forward positions at the various nodes yields the best return. FIG. 11 illustrates a flowchart of an exemplary strategy In describing this market environment in step 1102, the class of market participants being considered are those that do not have physical generators or loads and cannot influence spot prices. Furthermore, the set of flowgates which can bind in the forward market, the spot market, or both is denoted by Ψ and has dimension l. The sensitivity matrix A is as defined before and has dimension n×(l+1). In contrast to earlier market descriptions, there is now defined $\lambda^F$, the shadow prices in the forward market of the flowgates Ψ, and $\lambda^S$, the shadow prices for the same flowgates in the spot market.

As a result, the forward prices, F, and the spot prices, S, (each having dimension n×1) are given by:

$$F = A\lambda^F \quad S = A\lambda^S \tag{72}$$

For a market participant taking a financial position, y, at the n nodes in the forward market which is settled in the spot markets the trading gains are defined as:

$$\text{Net Trading Gains} = y'(S-F) = y'A(\lambda^S - \lambda^F) \tag{73}$$

Equation 73, in terms of the deltas vector defined earlier, can be rewritten in step 1104 as:

$$\text{Net Trading Gains} = \delta'(\lambda^S - \lambda^F) = \sum_{i=1}^{l+1} \delta_i(\lambda_i^S - \lambda_i^F) \tag{74}$$

Equation 74 can be interpreted as showing that finding an optimal trading strategy at the n nodes is equivalent to finding an optimal strategy for the forward deltas (i.e., $\delta_i | i=2, \ldots, l+1$) on the l constraints and for a forward position (i.e., $\delta_1$) at the reference node. Therefore, equation 74 turns an n-dimensional problem into an l+1 dimensional problem.

Intuitively, the strategy is to have large negative deltas for those constraints where the forward shadow prices are lower than corresponding spot shadow prices and have large positive deltas for those constraints where the forward shadow prices are higher in the forward market than in the spot market. While optimizing equation 74 is, in general, a coupled problem, typically the coupling is weak and each $\delta_i$ can be individually optimized. This is especially true for constraints which are electrically (or geographically) separated.

Because the taking of futures positions by a market participant can be expected to impact the forward prices, the market participant preferably, when optimizing equation 74, treats $\lambda^F$ as a function of the deltas. As a result, the optimizing problem includes a consideration of the trade-off between a lower-per-MWh profit on a higher volume transaction versus a higher per-MWh profit on a lower volume transaction.

As an example, assume there is one constraint (that is, l=1) and that there is no forward energy position at the reference node (that is, $\delta_1=0$). Consequently, the market participant is optimizing $\delta_2(\lambda_2^S - \lambda_2^F)$. Continuing with this example, The constraint's forward shadow price is $0/MWh when the market participant has a zero forward delta position. The market participant, however, estimates that for every increase in their short forward position of 100 MW on this constraint, the constraint's forward shadow price will increase by $2/MWh. Thus the participant estimates that $\lambda_2^F = 0.02\delta_2$. If the market participant also expects that the spot market value of the constraint shadow price is $10/MWh, then the participant estimates that $\lambda_2^S = 10$.

As a result, the strategy to optimize equation 74 becomes optimizing $\delta_2(10 - 0.02\delta_2)$ which results in $\delta_2 = 250$.

Once the participant has determined the optimal deltas vector in step 1106, then the portfolio of positions, y, is solved in step 1108 for using $\delta A'y$ to determine the positions to take at the forward nodes in the forward market.

The analysis extends to the class of market participants that possess physical generators or loads and/or can influence spot prices. A similar strategy as described in this section can be followed, with the exception that the objective function in the optimization now includes the profits and losses associated with the physical assets.

Inefficient Markets

As described previously, efficient market prices are characterized by a market in which spot prices are linear functions of a set of shadow prices. One of the shadow prices is associated with energy, while the other shadow prices are associated with potential congestion. These shadow prices change as congestion occurs.

Two practices that may lead to inefficient electricity markets are the use of regulatory agreements (e.g., Transmission Line Relief (TLR)) to curtail trades when transmission becomes congested and the imposition of externally applied transmission charges by transmission providers so as to make it unattractive to send power between different regions.

The TLR

Figure 12:
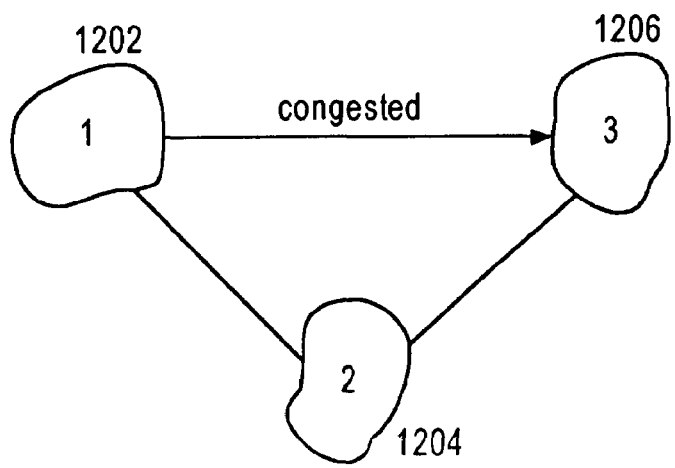
FIG. 12 illustrates an exemplary transmission network.

Typically, an agreement to curtail trades during transmission congestion will require the blockage of any transaction that increases the flow in the congested flowgate. Considering for example the zones in FIG. 12, Each of the zones have spot prices $S_i$ which can differ.

As an example distribution environment, only the flowgate from zone 1 1202 to zone 3 1206 may congest. Thus, in the exemplary environment of FIG. 12, the possible scenarios are:

a. No congestion occurs. Under these conditions, $S_1 = S_2 = S_3$.

b. Congestion occurs in the flowgate and there are marginal generators in zone 3 1206 and zone 2 1204. Under these conditions, $S_1 = S_2 \leq S_3$.

c. There is congestion in the flowgate and all zones have marginal generators.

These conditions only happen when $S_1 \leq S_2$ and $S_2 \leq S_3$.

d. There is congestion and there are marginal generators in zone 1 1202 and zone 3 1206. Under these conditions, $S_1 \leq S_2 = S_3$.

Under any of these mutually exclusive possibilities, $S_1 \leq S_2 \leq S_3$ (with all possible combinations of the inequalities possible).

When futures contracts are traded at the nodes of the constraint, for example at zone 1 1202 and zone 3 1206, there are futures prices denoted $F_1$ and $F_3$. Given the above described inequality relationship between the spot prices ($S_x$) under any condition, then the relationship of the futures prices can similarly be expressed as:

$$F_1 \leq F_2 \leq F_3 \tag{75}$$

In other words, the futures prices at the non-traded location (zone 2 1204) in this example must be bounded above and below by the futures prices at the two ends of the congested flowgate (the constraint).

Thus, for a general network, we can infer the arbitrage-free zonal spot pricing inequality relationship implied by a congested flowgate by simply sorting the flowgate PTDFs. The spot prices in the different zones will have the same sort order as the sorted flowgate PTDF vector. The spot pricing inequalities will generally be different for different flowgates. When one or more flowgates for a set Ψ can potentially congest for a prospective time period, the spot pricing inequalities are found by aggregating, using the binary OR operator, the spot pricing inequality relationships implied by congestion in each individual flowgate in $\Psi$.

External Transmission Charges

When an external charge, or tariff $E_{ij}$, is imposed, it becomes unattractive to send power from region i with spot price $S_i$ to region j with spot price $S_j$ unless $S_i > S_j + \tau_{ij}$. Generally, there is also a tariff (typically equal) for sending power in the opposite direction.

A simple example, below, considers a two zone system having a single lossless line in which no congestion is possible. The spot prices are $S_1$ and $S_2$ and the A matrix is just a column [1 1]'. There is a tariff $\tau_{21}$ charged for transmission of power from zone 2 to zone 1 and a tariff $\tau_{12}$ charged for transmission of power from zone 1 to zone 2.

The tariffs result in a market in which $$S_2 \leq S_1 + \tau_{12}$$

$$S_1 \leq S_2 + \tau_{21}$$

The futures prices $F_1$ and $F_2$ also satisfy similar conditions and, since the tariffs are non-negative, then:

$$F_1 - \tau_{12} \leq F_1 \leq F_2 + \tau_{21}$$

$$F_2 - \tau_{21} \leq F_2 \leq F_1 + \Sigma_{12}$$

When $\tau = \tau_{12} = \tau_{21}$, then the impact of this tariff, in the exemplary inefficient market which follows the above inequalities, results in:

$$|S_2 - S_1| \leq \tau \tag{76}$$

$$|F_2 - F_1| \leq \tau \tag{77}$$

In other words, the prices in the two zones are independent of each other within a threshold band and it is not efficient to transport power between the zones if the price difference is less than this threshold. Thus, in inefficient markets, it is more difficult to determine an exact relationship among the various forward prices at the different zones; instead, it is easier to establish bounds on these prices. Because of the absence of a linear relationship between the shadow prices and nodal spot prices seen in inefficient markets, equations 75 and 77 should be considered by a market participant when applying to inefficient markets the earlier described techniques and methods developed with reference to efficient markets.

Estimating the A Matrix

The sensitivity matrix A described herein was defined as consisting of empirically estimated or forecast Power Transfer Distribution Factors (PTDFs) corresponding to each flowgate in $\Psi$. The element k of column i can be interpreted as the ratio of a) the price differential between node k and the reference node to b) the maximum price differential in the system when the flowgate corresponding to column i is congested.

Alternatively, even an A matrix which is a linear transformation (i.e., post-multiplied by a non-singular square matrix) of the original A matrix can be used in any of the previously described techniques and methods for risk management in electricity transmission markets. However, the elements of the transformed A matrix are no longer interpreted as simply PTDFs but, rather, are considered linear combination of the various PTDFs. Similarly, the Lagrange multipliers $\lambda$ have a different interpretation as well.

Figure 13A:
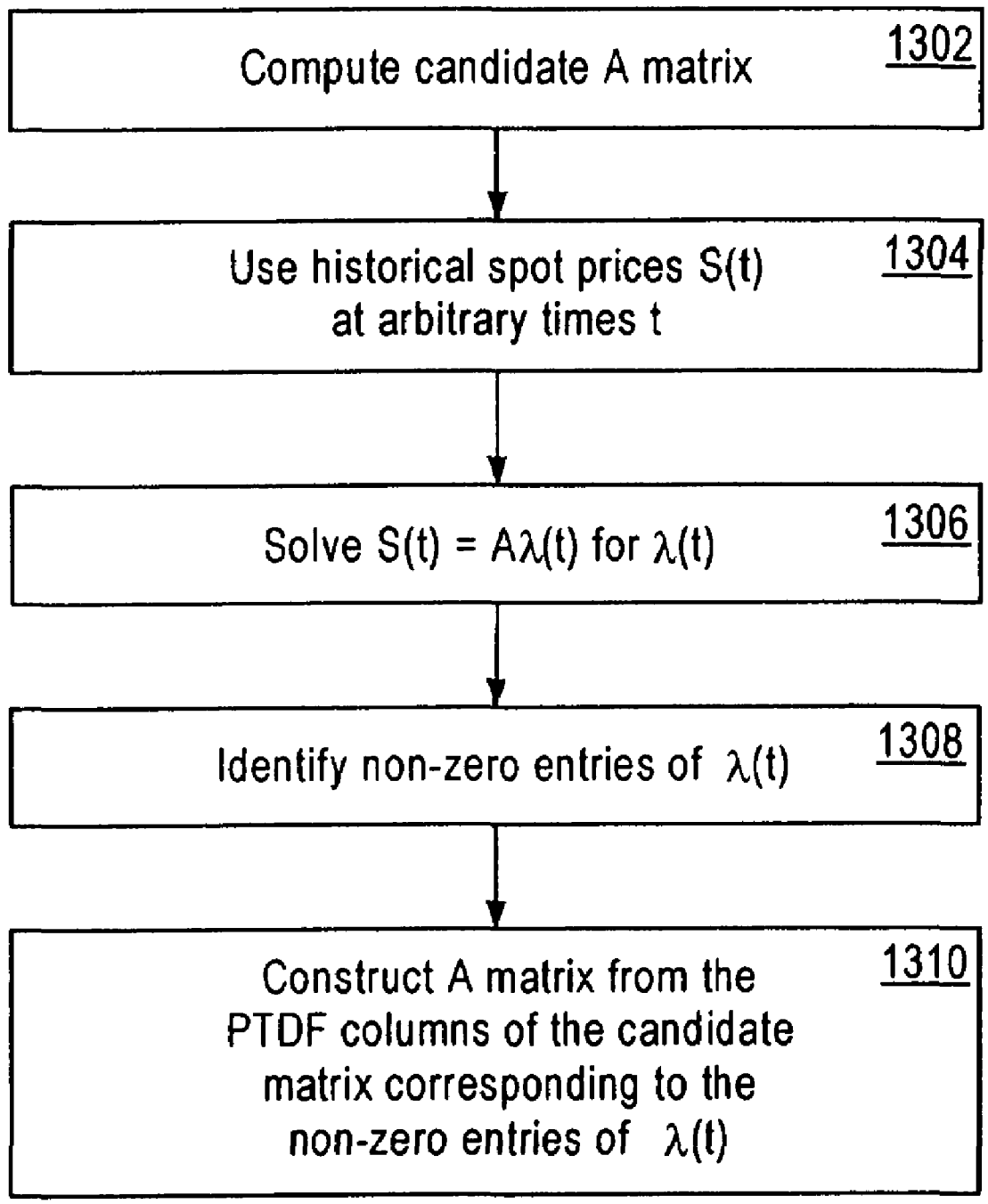
FIGS. 13A and 13B each depict an exemplary flowchart for implementing a method for determining the A matrix.
Figure 13B:
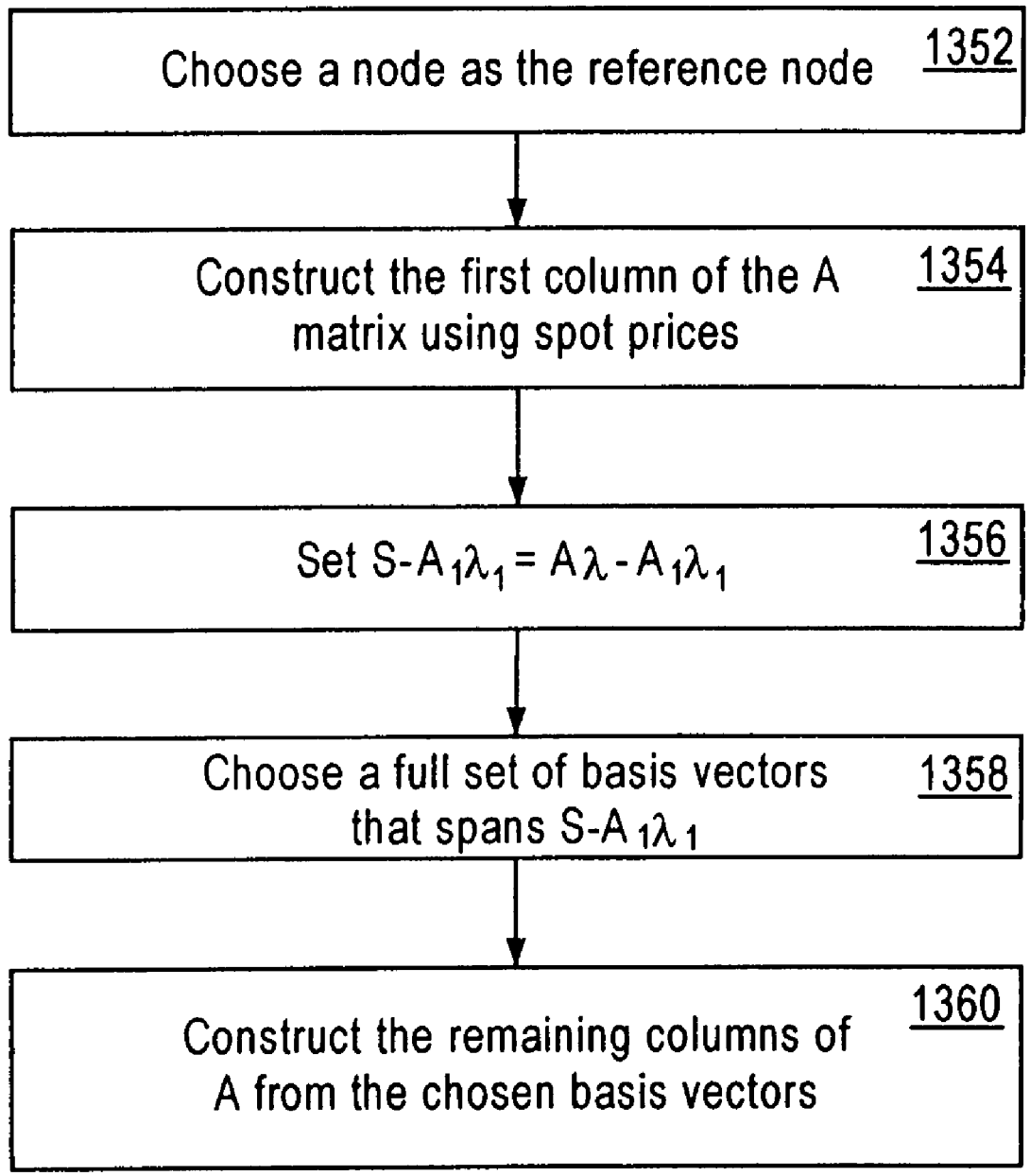

The matrix A (or the transformed matrix A) can be estimated from network flow models or based on historical spot prices. In determining the A matrix, the first step is selecting exactly which columns are represented, or, in other words, identifying the set $\Psi$ of credible, congestible flowgates. The second step is determining the numeric values for these columns. FIGS. 13A and 13B depict exemplary flowcharts for determining the A matrix.

If historical network data is available, then one way of determining the set $\Psi$ is to use the historical spot pricing pattern to see which constraints were historically binding. First, using any of various conventional techniques as understood by an artisan of ordinary skill in this field, a candidate A matrix is computed in step 1302. Then, for historical prices S(t) at an arbitrary time t, the equation $S(t) = A\lambda(t)$ is solved in steps 1304 and 1306 for $\lambda(t)$. The solution will normally yield in step 1308 a few non-zero entries for $\lambda(t)$ and can be repeated for more than one time t. Thus a set, $\Lambda$, will be formed:

$$\Lambda = \{k | \lambda_k(t) 0, k > 1\} \tag{78}$$

where for each $k \in \Lambda$, the flowgate corresponding to the PTDF column k of the candidate matrix A is binding at the time t with a shadow price $\lambda_k(t)$. This set of all such columns of A can be used in step 1310 to define the set $\Psi$. The completeness of $\Psi$ which is determined using this method can be improved by examining enough spot pricing data to span the range of historical constraints and ensuring that the candidate matrix contains linearly independent columns.

Another, alternative method for calculating the matrix A can be utilized if access to historical spot pricing data is available but access to network data or historical data for $\Psi$ is unavailable. In this method, the matrix A which is determined is not necessarily the PTDF sensitivity matrix for the set $\Psi$, but is at least a linear transformation of that sensitivity matrix.

First, an arbitrary node is chosen in step 1352 as the reference node. Then column $A_1$ is constructed in step 1354 such that the $k^{th}$ entry is the ratio of the spot price at the $k^{th}$ location to the spot price at the reference node. Next, the equation $S = A\lambda$ is modified in step 1356 to be $$S - A_1 \lambda_1 = A\lambda - A_1 \lambda_1 \tag{79}$$

In equation 79, the left side of the equation is known. S is the spot prices, $A_1$ was just calculated, and $\lambda_1$ is the spot price at the reference node. Assuming there is enough spot pricing data available to span all the unknown PTDFs of the set $\Psi$, then choosing in step 1358 a full set of basis vectors that spans the historical data $S - A_1 \lambda_1$ provides in step 1360 the remaining columns of A. The mechanics of determining the basis vectors for a set of matrix columns is a well known numerical linear algebra problem that results in a set of independent vector columns equal in number to the number of independent flowgates.

In a special case when it is known that only one flowgate was congested at time t, then the congested flowgate at time t would be the flowgate connecting the highest priced node to the lowest priced node in S(t). Moreover, the value of the $k^{th}$ entry of the PTDF column corresponding to the constrained flowgate equals $(S_k - S_{REF})/(\max(S) - \min(S))$ where $S_{REF}$ refers to the spot price at the reference node.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed is:

1. A method for managing risk in a market related to a commodity delivered over a network of one or more congestible lines, the market including at least one traded instrument, a locational derivative contract, and future shadow prices which depend on congestion in the one or more congestible lines, the method comprising the steps of:
- a computer system identifying an equation for determining a fair market value of the locational derivative contract, wherein the fair market value is based, at least in part, on the future shadow prices to obtain a fair market value equation;
- the computer system calculating a partial derivative of the fair market value equation with respect to the future shadow prices to obtain a calculated partial derivative; and
- the computer system generating an indication of risk to congestion for the locational derivative contract based on the calculated partial derivative.

2. The method of claim 1, wherein the indication of risk that is generated specifies whether the locational derivative contract is long, short or neutral to congestion in the one or more congestible lines.

3. The method of claim 1, wherein the locational derivative contract is one of a Transmission Congestion Contract ("TCC"), TCC option with a zero strike price, TCC option with a non-zero strike price, portfolio of TCCs, portfolio of TCC options, seller's choice contracts, portfolios of seller's choice contracts, futures positions, options, portfolio of options, and portfolio of futures positions.

4. The method of claim 1, wherein the locational derivative contract is a non-linear derivative contract.

5. The method of claim 4, wherein the locational derivative contract is one of a seller's choice contract and an option.

6. The method according to claim 1, wherein the step of identifying includes the steps of:
- determining a payoff value of the locational derivative contract at a predetermined time;
- determining a net trading gain of a position y in the at least one traded instrument, and
- adding the payoff value and the net trading gain to generate the identified equation.

7. The method according to claim 1, wherein the partial derivative is a vector $\delta$ and the future shadow prices are a vector $\lambda$ having a same cardinality as $\delta$, such that each element of $\delta$, $\delta_i$, corresponds to the calculated partial derivative of the fair market value equation with respect to a respective element of $\lambda$, $\lambda_i$.

8. The method according to claim 1, wherein the market is an inefficient market.

9. A method for optimizing a position, y, in a multi-settlement market related to a commodity delivered over a network of one or more congestible lines, the position, y, including taking forward positions at different nodes in the network which are settled against real-time spot prices, and the multi-settlement market including future shadow prices, $\lambda^F$ which depend on congestion in the one or more congestible lines and spot shadow prices $\lambda^S$, the method comprising the steps of:
- a computer system modeling a net trading gain of the position y as a summation $\delta'(\lambda^S - \lambda^F)$ to obtain a modeled net trading gain;
- the computer system optimizing the modeled net trading gain to identify the individual elements of $\delta$, where $\delta'$ represents the transpose of $\delta$;
- the computer system calculating the position y which satisfies $\delta = A'y$, wherein A is a matrix representing the underlying physics of the network, and A' represents the transpose of the matrix A, and
- the computer system generating an indication of the position y.

10. The method of claim 9, wherein $\lambda^F$ is considered to be a function of $\delta$.

* * * * *